(12) United States Patent
Kim et al.

(10) Patent No.: US 9,041,862 B2
(45) Date of Patent: *May 26, 2015

(54) DISPLAY APPARATUS AND METHOD FOR CONTROLLING THE DISPLAY APPARATUS

(71) Applicant: LG Electronics Inc., Seoul (KR)

(72) Inventors: Seungwon Kim, Seoul (KR); Youngho Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,126

(22) Filed: Jul. 11, 2014

(65) Prior Publication Data

US 2014/0325560 A1    Oct. 30, 2014

Related U.S. Application Data

(63) Continuation of application No. 13/071,226, filed on Mar. 24, 2011, now Pat. No. 8,804,039.

(60) Provisional application No. 61/391,089, filed on Oct. 8, 2010.

(30) Foreign Application Priority Data

Nov. 16, 2010    (KR) .................. 10-2010-0113794

(51) Int. Cl.
*H04N 5/445* (2011.01)
*H04N 7/00* (2011.01)
*H04N 21/443* (2011.01)
*G06F 9/44* (2006.01)
*H04N 21/485* (2011.01)

(52) U.S. Cl.
CPC ............ *H04N 21/443* (2013.01); *G06F 9/4401* (2013.01); *H04N 21/4438* (2013.01); *H04N 21/485* (2013.01)

(58) Field of Classification Search
USPC .................. 348/552–570, 725, 731, 714, 719
See application file for complete search history.

(56) References Cited

U.S. PATENT DOCUMENTS

| | | |
|---|---|---|
| 5,838,383 A | 11/1998 | Chimoto et al. |
| 6,198,510 B1 * | 3/2001 | Suzukawa et al. ............ 348/552 |
| 6,202,212 B1 * | 3/2001 | Sturgeon et al. ............. 725/141 |
| 6,219,042 B1 | 4/2001 | Anderson |
| 6,486,883 B1 | 11/2002 | Mathur |
| 6,788,352 B2 | 9/2004 | Kim |
| 6,943,845 B2 * | 9/2005 | Mizutome et al. ............ 348/555 |
| 8,253,857 B2 * | 8/2012 | Koike et al. .................. 348/552 |
| 2005/0168638 A1 | 8/2005 | Iwata |

(Continued)

OTHER PUBLICATIONS

European Search Report dated Jul. 22, 2011 for Appln. No. 11001748.
U.S. Office Action for parent U.S. Appl. No. 13/071,226 dated Aug. 29, 2012.
U.S. Office Action for parent U.S. Appl. No. 13/071,226 dated Jan. 17, 2013.

(Continued)

*Primary Examiner* — Michael Lee
(74) *Attorney, Agent, or Firm* — KED & Associates LLP

(57) ABSTRACT

A multifunctional display device includes a processor to control display of information during booting of an operating system. The operating system is booted in response to a predetermined signal and displayed the information includes first information corresponding to visual information, and second information indicating that the operating system is currently booting. The operating system is one which controls display of multimedia content.

20 Claims, 17 Drawing Sheets

(56) References Cited

U.S. PATENT DOCUMENTS

2010/0060787 A1* 3/2010 Watanabe .................... 348/553
2010/0077192 A1 3/2010 Kuo et al.

OTHER PUBLICATIONS

U.S. Office Action for parent U.S. Appl. No. 13/071,226 dated Nov. 20, 2013.

* cited by examiner

DISPLAY APPARATUS AND METHOD FOR CONTROLLING THE DISPLAY APPARATUS

CROSS-REFERENCE TO RELATED APPLICATIONS

This application is a Continuation Application of U.S. application Ser. No. 13/071,226, filed Mar. 24, 2011 (now U.S. Pat. No. 8,804,039), which claims the benefit of priority of U.S. Provisional Application No. 61/391,089, filed on Oct. 8, 2010, and Korean Application No. 10-2010-0113794 filed on Nov. 16, 2010, the contents of which is incorporated herein by reference.

BACKGROUND

1. Field

One or more embodiments described herein relate to managing and displaying information on an electronic device.

2. Background

A variety of display devices are currently in use, including televisions, monitors, smart phones, music and video players, computers, PDAs, and many, many more. Many of these devices boot of one or more applications and include an operating system in order to manage the same. Often times, however, this booting process takes a considerable amount of time, which is considered undesirable by users.

DETAILED DESCRIPTION

Figure 1:
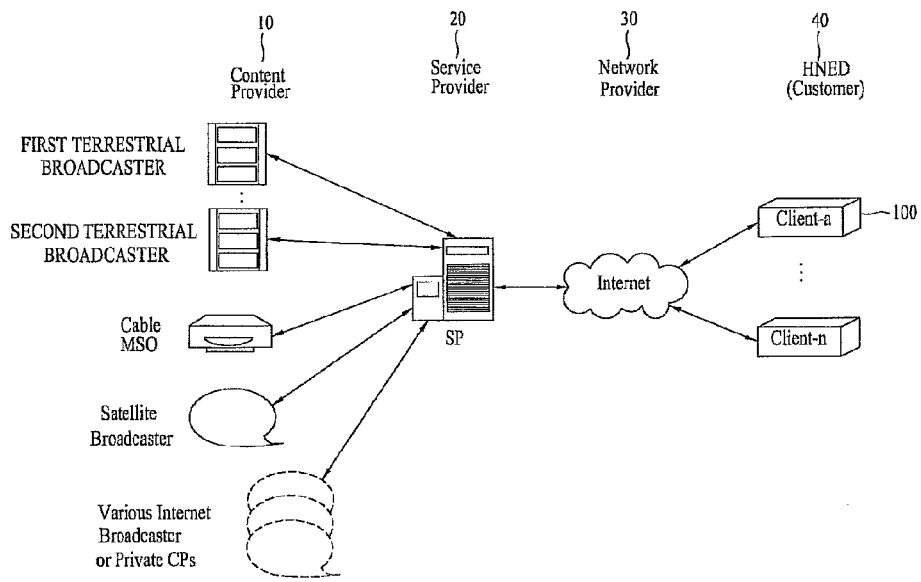
FIG. 1 shows one embodiment of a broadcasting system.

FIG. 1 shows an example of a broadcasting system including a display device according to one embodiment of the present invention includes a content provider (CP) 10, a service provider (SP) 20, a network provider (NP) 30, and a home network end user (HNED) 40. The HNED 40 corresponds to, for example, a client 100 which is a display device according to the embodiment of the present invention. The client 100 corresponds to the display device according to one embodiment of the present invention, wherein examples of the display device include network TV, smart TV, and IPTV.

The content provider 10 manufactures various contents and provides them. Examples of the content provider 10 include a terrestrial broadcaster, a cable system operator (SO), a multiple system operator (MSO), a satellite broadcaster, and an Internet broadcaster, as illustrated in FIG. 1.

Also, the content provider 10 may provide various applications in addition to broadcast contents, which will be described in more detail later.

The service provider 20 can provide contents provided by the content provider 10 by service packaging them. For example, the service provider 20 of FIG. 1 can package first terrestrial broadcasting, second terrestrial broadcasting, cable MSO, satellite broadcasting, various kinds of Internet broadcasting, application, etc. and provide the packaged one to a user.

In the meantime, the service provider 20 may provide a service to the client 100 by using a unicast or multicast mode. The unicast mode is to transmit data between a single transmitter and a single receiver 1:1. In case of the unicast mode, for example, if the receiver requests a server to transmit data, the server can transmit data to the receiver in accordance with the request. The multicast mode is to transmit data to a plurality of receivers of a specific group. For example, the server can transmit data to a plurality of receivers, which are previously registered therewith, at one time. For this multicast registration, IGMP (Internet Group Management Protocol) can be used.

The network provider 30 may provide a network for providing a service to the client 100. The client 100 may construct a home network end user (HNED) to receive a service.

In the system of the aforementioned display device, conditional access or content protection can be used to protect contents which are transmitted. For conditional access or content protection, a cable card or downloadable conditional access system (DCAS) can be used.

In the meantime, the client 100 may provide contents through the network. In this case, the client 100 may be a content provider contrary to the above. The content provider 10 may receive contents from the client 100. In this case, it is advantageous in that bidirectional content service or data service is available.

Figure 2:
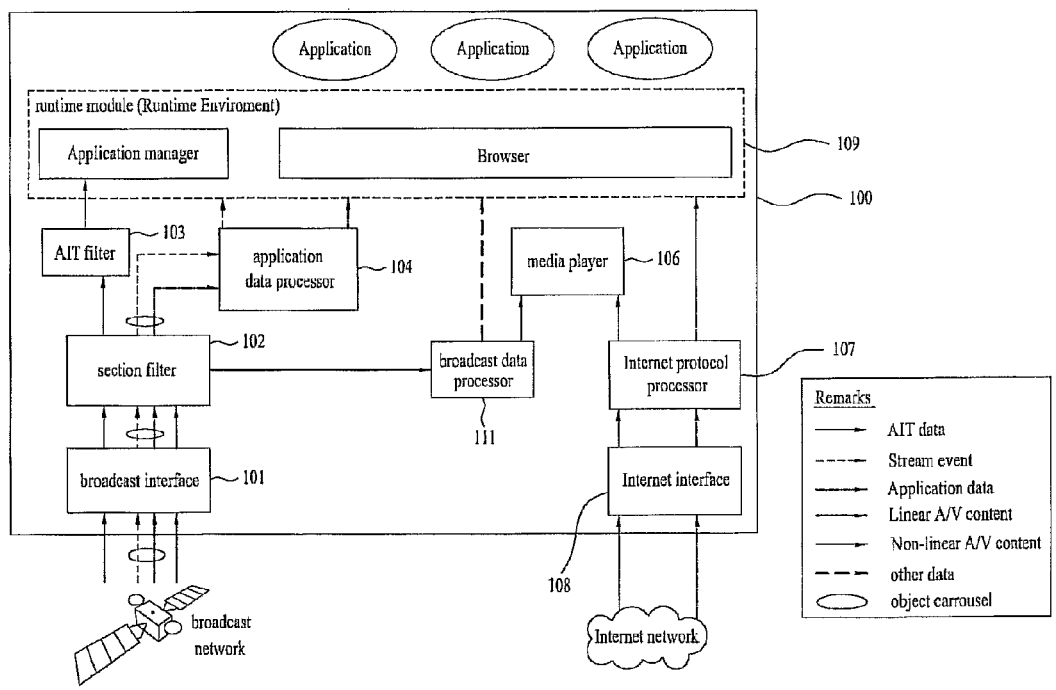
FIG. 2 shows another embodiment of a broadcasting system.

FIG. 2 shows another example of a broadcasting system including a display device 100 connected with a broadcast network or Internet network. The display device 100 may include a broadcast interface 101, a section filter 102, an AIT filter 103, an application data processor 104, a broadcast data processor 111, a media player 106, an Internet protocol processor 107, an Internet interface 108, and a runtime module 109. Examples of the display device 100 include network TV, smart TV, HBBTV, laptop or notebook computers, PDAs, smart phones, as well as any other portable or fixed device capable of displaying multimedia information.

Application information table (AIT) data, a real-time broadcast content, application data, and stream event are received through the broadcast interface 101. The real-time broadcast content may be designated as a linear A/V content.

The section filter 102 performs section filtering for four kinds of data received through the broadcast interface 101. Then, the section filter 102 transmits AIT data to the AIT filter 103, the linear A/V content to the broadcast data processor 111, and stream event and application data to the application data processor 104.

In the meantime, a non-linear A/V content and application data are received through the Internet interface 108. The non-linear A/V content may be content on demand (COD) application, for example. The non-linear A/V content is transmitted to the media player 106, and the application data is transmitted to the runtime module 109.

Moreover, the runtime module 109, as illustrated in FIG. 2, includes an application manager and a browser, for example. The application manager controls a lifecycle for an interactive application by using the AIT data. The browser serves to display and process the interactive application.

Figure 3:
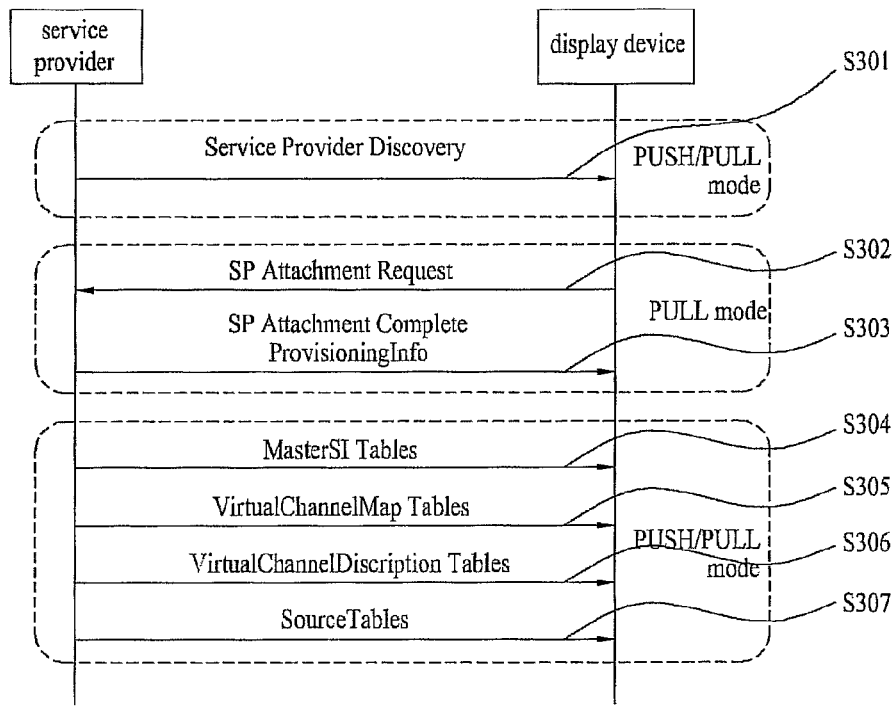
FIG. 3 shows a process for receiving channel information in a display device in a broadcasting system according to one of the aforementioned embodiments.

FIG. 3 shows a process for receiving channel information in a display device according to one of the aforementioned embodiments, which display device is included in a broadcasting system and which receives information from one or more service providers.

The service provider may perform service provider discovery (S301), and the display device may transmit a service provider (SP) attachment request signal (S302). If SP attachment is finished, the display device receives provisioning information (S303). Moreover, the display device receives a master SI table from the service provider (S304), receives a virtual channel map table (S305), receives a virtual channel description table (S306), and receives a source table (S307).

Hereinafter, the process steps for receiving channel information will be described in more detail. The service provider discovery may mean that service providers, which provide IPTV related services, discover a service discovery (SD) server that provides information on the service providers.

For example, three methods for discovering an address list that can receive information (for example, SP discovery information) on the SD server will be provided as follows. First of all, an address previously set by the display device or an address set by a manual operation of the user can be used. Second, a DHCP based SP discovery method can be used. Third, a DNS SRV-based SP discovery method can be used. Also, the display device accesses a server of an address acquired by any one of the above three methods and receives a service provider discovery record that includes information required for service discovery per SP. Then, the display device performs a service search step by using the received service provider discovery record. The above steps can be performed in a push mode or pull mode.

The display device performs a registration procedure (or service attachment procedure) by accessing the SP attachment server designated by an SP attachment locator of the SP discovery record.

Moreover, after performing a separate authentication procedure by accessing an SP authentication service server designated by an SP authentication locator, the display device may perform a service authentication procedure.

In the meantime, after the service attachment procedure is successfully performed, data transmitted from the server to the display device may be a form of a provisioning information table.

The display device transmits the data to the service attachment server during the service attachment procedure, wherein the data includes ID and location information of the display device. The service attachment server can define a service subscribed by the display device, based on the received data. Moreover, address information that can acquire service information desired to be received by the display device is provided in the form of the provisioning information table. The address information corresponds to access information of the master SI table. In this case, it is easy to provide a customized service per subscriber.

The service information includes a master SI table record that manages access information and version on the virtual channel map, a virtual channel map table that provides a package type service list, a virtual channel description table that includes detailed information of each channel, and a source table that includes access information that enables actual access to services.

Figure 4:
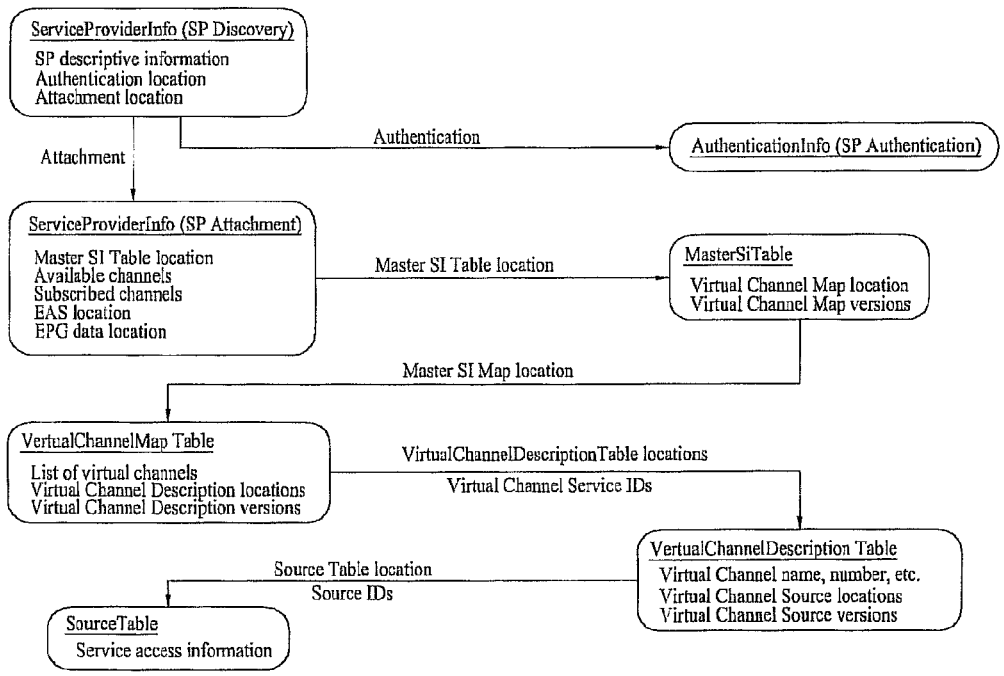
FIG. 4 shows an example of data used in the aforementioned process.

FIG. 4 shows an example of data used in the aforementioned process, and one type of relationship that may exist for data within the SI. The mater SI table includes location information that can receive each virtual channel map and version information of each virtual channel map.

Each virtual channel map is uniquely identified by a virtual channel map identifier, and virtual channel map version represents version information of the virtual channel map. If any one of all tables connected to one another along an arrow starting from the master SI table in FIG. 4 is changed, version of all upper tables (to reach master SI table) is increased together with increase of the corresponding table. Accordingly, it is advantageous in that the display device can identify change on all SI tables directly by monitoring the master SI table.

For example, if there is any change of the source table, version of the source table is increased, and version of the virtual channel description table for reference of the source table is also changed. Accordingly, change of a lower table causes change of an upper table, whereby version of the master SI table is finally changed.

The master SI table may exist per service provider. However, if configuration of the service is varied per location or subscriber (or subscriber group), the service provider is designed to have a plurality of master SI tables, thereby providing a customized service per each unit. In this way, if the service provider is designed, it is possible to efficiently provide a customized service for location of a subscriber and subscription information through the master SI table.

The virtual channel map table may have one or more virtual channels, and includes location information that can acquire detailed information of the channel without including the detailed information in the virtual channel map. Virtual channel description location of the virtual channel map table indicates location of the virtual channel description table that includes detailed information of the channel.

The virtual channel description table includes detailed information of the virtual channel, and can access the virtual channel description table by using the virtual channel description location of the virtual channel map table.

The source table provides access information (for example, IP address, port, AV codec, transport protocol, etc.) per service, wherein the access information is required for actual access to the service.

The aforementioned master SI table, the virtual channel map table, the virtual channel description table, and the source table are transferred through four flows, which are logically divided from one another, in a push mode or pull mode. In the meantime, the master SI table can be transmitted in a multicast mode for version management, and monitors version change by receiving multicast streaming.

Figure 5:
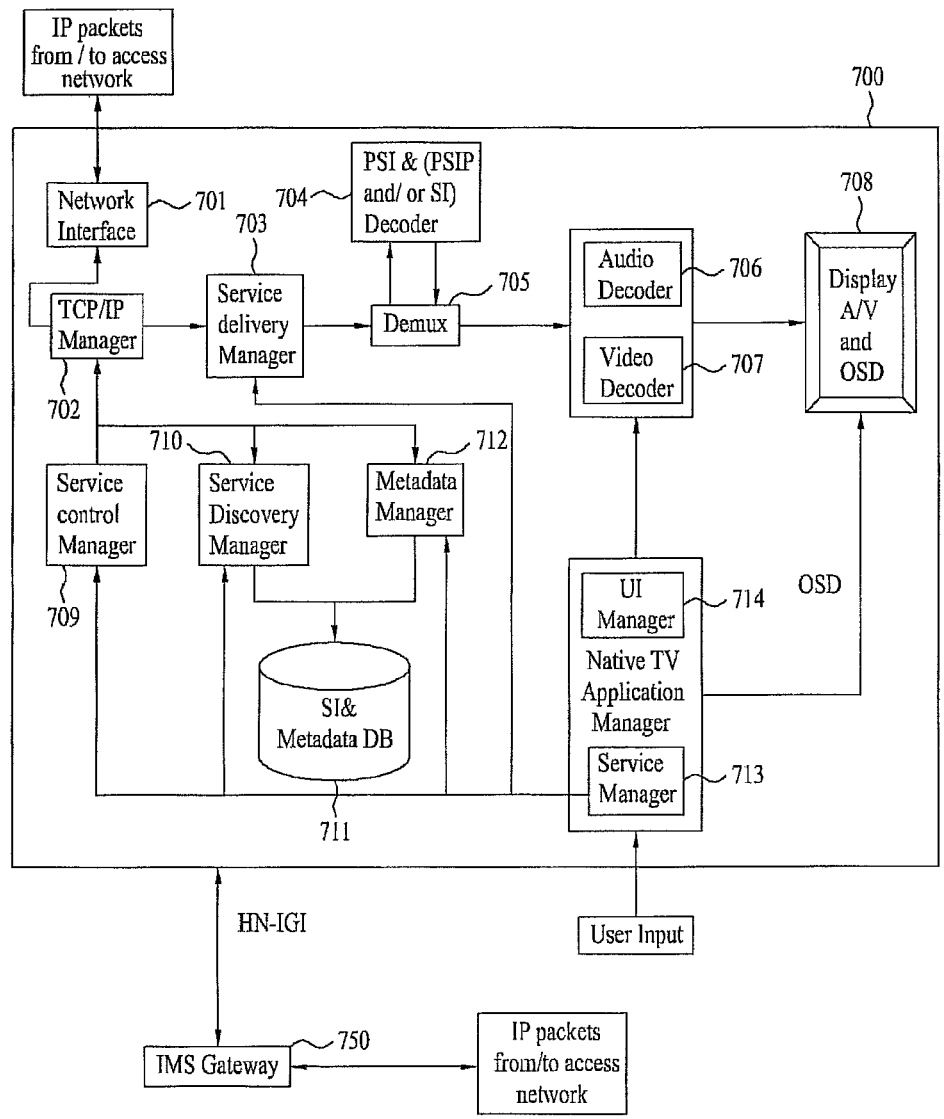
FIG. 5 shows one example of a display device.

FIG. 5 shows one example of a display device 700 which includes a network interface 701, a TCP/IP manager 702, a service delivery manager 703, a demultiplexer (Demux) 705, a PSI& (PSIP and/or SI) decoder 704, an audio decoder 706, a video decoder 707, a display A/V and OSD module 708, a service control manager 709, a service discovery manager 710, a metadata manager 712, an SI&Metadata DB 711, a UI manager 714, and a service manager 713.

The network interface 701 receives packets from a network, and transmits the packets to the network. In other words, the network interface 701 receives services, contents, etc. from the service provider through the network.

The TCP/IP manager 702 is involved in packets received in the display device 700 and packets transmitted from the display device 700, i.e., packet transfer from the source to the destination. The TCP/IP manager 702 sorts the received packets to correspond to a proper protocol, and outputs the sorted packets to the service delivery manager 705, the service discovery manager 710, the service control manager 709, and the metadata manager 712.

The service delivery manager 703 takes the role of control of received service data. For example, if the service delivery manager 703 controls real-time streaming data, it can use RTP/RTCP. If the service delivery manager 703 transmits the real-time streaming data by using RTP, it parses the received packets in accordance with RTP and transmits the parsed packets to the demultiplexer 705 or stores the parsed packets in the SI&Metadata DB 711 under the control of the service manager 713. The service delivery manager 703 feeds the received information back to a server, which provides a service, by using RTCP.

The demultiplexer 705 demultiplexes the received packets to audio, video and PSI (Program Specific Information) data and then transmits the demultiplexed data to the audio decoder 706, the video decoder 707, and the PSI& (PSIP and/or SI) decoder 704, respectively.

The PSI& (PSIP and/or SI) decoder 704 decodes service information such as PSI, for example. Namely, the PSI& (PSIP and/or SI) decoder 704 receives and decodes PSI section, PSIP (Program and Service Information Protocol) section or SI (Service Information) section, which is demultiplexed by the demultiplexer 705.

Also, the PSI& (PSIP and/or SI) decoder 704 decodes the received sections to make a database for service information, and stores the database for service information in the SI&Metadata DB 711.

The audio/video decoders 706/707 decode the video data and the audio data, which are received from the demultiplexer 705. The audio data decoded by the audio decoder 706 and the video data decoded by the video decoder 707 are provided to the user through the display 708.

The UI manager 714 and the service manager 713 manage the whole state of the display device 700, provide a user interface, and manage other managers. The UI manager 714 provides a graphic user interface for the user by using an on screen display (OSD), and performs a receiving operation based on a key input from the user. For example, if a key input signal for channel selection is input from the user, the UI manager 714 transmits the key input signal to the service manager 713.

The service manager 713 controls managers related to the service, such as the service delivery manager 703, the service discovery manager 710, the service control manager 709, and the metadata manager 712.

Also, the service manager 713 makes a channel map and selects a channel by using the channel map in accordance with the key input signal received from the UI manager 714. The service manager 713 receives service information of the channel from the PSI& (PSIP and/or SI) decoder 704 and sets audio/video PID (Packet Identifier) of the selected channel in the demultiplexer 705.

The service discovery manager 710 provides information required to select the service provider that provides services. If a signal related to channel selection is received from the service manager 713, the service discovery manager 710 discovers a corresponding service by using the received information.

The service control manager 709 takes the role of selection and control of the service. For example, if the user selects a live broadcasting service like the existing broadcasting mode, the service control manager 709 uses IGMP or RTSP. If the user selects a video on demand (VOD) service, the service control manager 709 selects and controls the service by using RTSP. The RTSP protocol can provide a trick mode for real-time streaming. Also, the service control manager 709 can initiate and manage a session through IMC gate by using IMS (IP Multimedia Subsystem) and Session Initiation Protocol (SIP). The above protocols are only exemplary, and other protocols may be used depending on embodiments.

The metadata manager 712 manages metadata related to the service and stores the metadata in the SI&Metadata DB 711. The SI&Metadata DB 711 stores the service information decoded by the PSI& (PSIP and/or SI) decoder 704, the metadata managed by the metadata manager 712, and the information required to select the service provider provided by the service discovery manager 710. Also, the SI&Metadata DB 711 may store setup data for the system.

The SI&Metadata DB 711 may be implemented by using a NonVolatile RAM (NVRAM) or a flash memory, and the IG 750 is a gateway where functions required for access to IMS based IPTV services are gathered.

Figure 6:
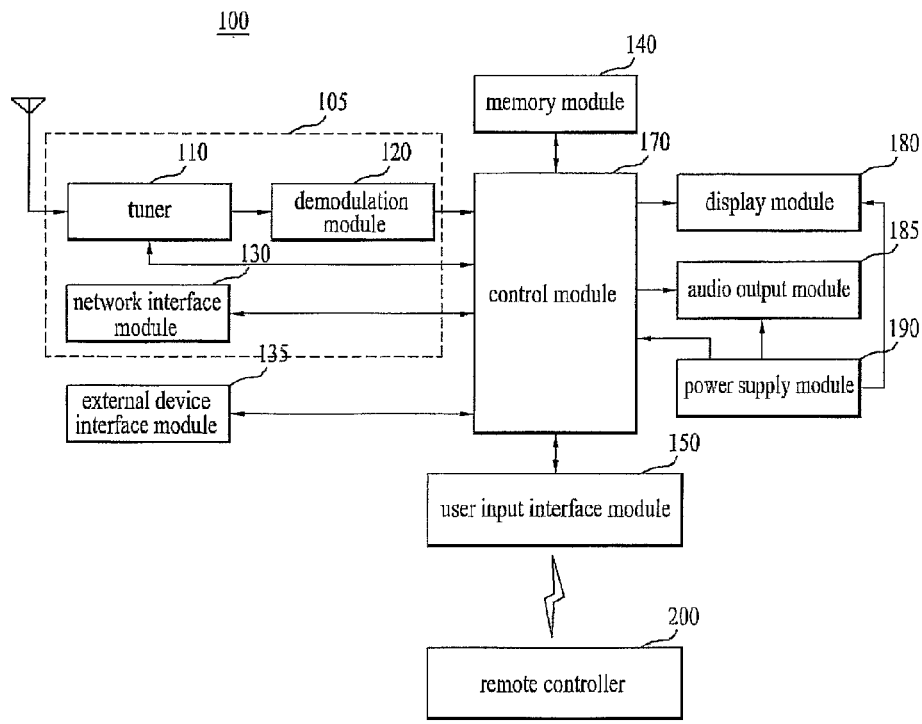
FIG. 6 shows another example of a display device.

FIG. 6 shows another example of a display device 100 which includes a broadcast receiver 105, an external device interface module 135, a memory module 140, a user input interface module 150, a control module 170, a display module 180, an audio output module 185, a power supply module 190, and a camera module (not shown). The broadcast receiver 105 includes a tuner 110, a demodulation module 120, and a network interface module 130. As occasion demands, the broadcast receiver 105 may be designed in such a manner that it includes a tuner 110 and a demodulation module 120 but does not include a network interface module 130. On the contrary, the broadcast receiver 105 may be designed in such a manner that it includes a network interface module 130 but does not include a tuner 110 and a demodulation module 120.

The tuner 110 selects one of RF (radio frequency) broadcast signals received through an antenna, which corresponds to a channel selected by the user or all previously stored channels. Also, the tuner 110 converts the selected RF broadcast signal to an intermediate frequency signal or a baseband video or audio signal.

For example, if the selected RF broadcast signal is a digital broadcast signal, the tuner 110 coverts the selected RF broadcast signal to a digital IF (DIF) signal. If the selected RF broadcast signal is an analog broadcast signal, the tuner 110 coverts the selected RF broadcast signal to an analog baseband video or audio signal (CVBS/SIF). In other words, the tuner 110 can process both the digital broadcast signal and the analog broadcast signal. The analog baseband video or audio signal (CVBS/SIF) output from the tuner 110 may directly be input to the control module 170.

Also, the tuner 110 can receive RF broadcast signal of a single carrier based on an advanced television system committee (ATSC) mode and RF broadcast signal of multiple carriers based on a digital video broadcasting mode (DVB).

In the meantime, the tuner 110 sequentially selects RF broadcast signals of all broadcast channels stored through a channel memory function from RF broadcast signals received through the antenna, and converts the selected RF broadcast signals to intermediate frequency signals or baseband video or audio signals.

The demodulation module 120 receives the digital IF (DIF) signal converted by the tuner 110 and demodulates the received digital IF signal.

For example, if the digital IF signal output from the tuner 110 is based on the ATSC mode, the demodulation module 120 performs 8-vestigal side band (8-VSB) demodulation, for example. Also, the demodulation module 120 may perform channel decoding. To this end, the demodulation module 120 may include a trellis decoder, a de-interleaver, and a Reed-Solomon decoder to perform trellis decoding, de-interleaving, and Reed-Solomon decoding.

For example, if the digital IF signal output from the tuner 110 is based on the DVB mode, the demodulation module 120 performs coded orthogonal frequency division modulation (COFDMA) demodulation, for example. Also, the demodulation module 120 may perform channel decoding. To this end, the demodulation module 120 may include a convolution decoder, a de-interleaver, and a Reed-Solomon decoder to perform convolution decoding, de-interleaving, and Reed-Solomon decoding.

The demodulation module 120 can output a stream signal (TS) after performing demodulation and channel decoding. At this time, the stream signal may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. Specifically, the MPEG-2 TS may include a 4 byte header and 184 byte payload.

The aforementioned demodulation module 120 may be provided separately depending on the ATSC mode and the DVB mode. Namely, an ATSC demodulation module and a DVB demodulation module may be provided separately.

The stream signal output from the demodulation module 120 may be input to the control module 170. The control module 170 performs demultiplexing, video/audio signal processing, etc. and then outputs video to the display module 180 and audio to the audio output module 185.

The external device interface module 135 may connect an external device to the display device 100. To this end, the external device interface module 135 may include an A/V input/output unit (not shown) or a wireless communication unit (not shown).

The external device interface module 135 is connected to external devices such as Digital Versatile Disks (DVD), Blu-rays, game devices, cameras, camcorders, computers (e.g., notebook computers), etc. through wire/wireless cables. The external device interface module 135 transmits a video, audio, or data signal externally input through an external device connected thereto, to the control module 170 of the display device 100. Also, the external device interface module 135 outputs the video, audio or data signal processed by the control module 170 to the external device. To this end, the external device interface module 135 may include an A/V input/output unit (not shown) or a wireless communication unit (not shown).

The A/V input/output unit of the external input circuit may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the display device 100.

The wireless communication unit may perform a short-distance wireless communication with other electronic devices. For example, communication standards such as Bluetooth, Radio Frequency Identification (RFID), infrared Data Association (IrDA), Ultra Wideband (UWB), ZigBee, Digital Living Network Alliance (DLNA), etc. can be used for the short-distance wireless communication, whereby network connection between the display device 100 and other electronic devices can be performed.

In addition, the external device interface module 135 may be connected to various set-top boxes through at least one of the above-mentioned various terminals to perform input/output operation with the set-top boxes. The external device interface module 135 receives an application of a neighboring external device or list of applications and transmits the received application or the list of applications to the control module 170 or the memory module 140.

The network interface module 130 provides interface for connecting the display device 100 with wire/wireless networks including Internet network. The network interface module 130 may include an Ethernet terminal, for example, for wire network connection. Also, for example, Wireless LAN (WLAN)(Wi-Fi), Wireless broadband (Wibro), World Interoperability for Microwave Access (Wimax), High Speed Downlink Packet Access (HSDPA) can be used for the wireless network connection.

The network interface module 130 transmits or receives data to and from other users or other electronic devices through a network connected thereto or another network linked on the connected network. In particular, the network interface module 130 can transmit some contents data stored in the display device 100 to a user or electronic device selected from other users or electronic devices previously registered with the display device 100.

Also, the network interface module 130 can access a predetermined web page through a network connected thereto or another network linked on the connected network. In other words, the network interface module 130 can transmit or receive data to and from a corresponding server by accessing the predetermined web page through the corresponding network.

In addition, the network interface module 130 can receive contents or data provided by the content provider or the network operator. In other words, the network interface module 130 can receive contents such as movies, advertisements, games, VOD, broadcast signals, etc. and related information, which are provided from the content provider or the network provider through the network.

Also, the network interface module 130 can receive update information and update files of firmware provided by the network operator. Moreover, the network interface module 130 can transmit data to the Internet or content provider or the network operator. Furthermore, the network interface module 130 can selectively receive a desired one of contents open to the public, through the network.

Also, the network interface module 130 can transmit or receive contents or data of a list of contents to and from a predetermined server through the network.

The memory module 140 may store a program for processing and controlling each signal of the control module 170, or may store the processed video, audio or data signal.

Also, the memory module 140 may temporarily store the video, audio or data signal input from the external device interface module 135 or the network interface module 130. The memory module 140 may store information on a predetermined broadcast channel through a channel memory function.

Also, the memory module 140 may store the application or the list of applications input from the external device interface module 135 or the network interface module 130.

Also, the memory module 140 may store the contents or the list of contents input from the external device interface module 135 or the network interface module 130. For example, the memory module 140 may include a storage medium of at least one type of a flash memory type, a hard disk type, a multimedia card micro type, a card type memory (for example, SD or XD memory), RAM and ROM (EEPROM, etc.) The display device 100 can play contents files (moving picture files, still image files, music files, application files, etc.) stored in the memory module 140 to provide the played contents files to the user.

Although FIG. 6 illustrates that the memory module 140 and the control module 170 are provided separately, these modules may be combined in other embodiments. For example, according to one embodiment, memory module 140 may be included in the control module 170.

The user input interface module 150 transmits the signal input by the user to the control module 170 or transmits the signal from the control module 170 to the user. For example, the user input interface module 150 may receive a control signal such as power on/off, channel selection and screen setup from the remote controller 200 or transmit the control signal from the control module 170 to the remote controller 200 in accordance with various communication modes such as RF communication mode and IR communication mode.

Also, for example, the user input interface module 150 may transmit a control signal input by a local key (not shown) such as a power key, a channel key, a volume key, and a setup key to the control module 170.

Also, for example, the user input interface module 150 may transmit a control signal input by a sensing unit (not shown), which senses gesture of the user, to the control module 170, or may transmit the signal from the control module 170 to the sensing unit. In this case, the sensing unit may include a touch sensor, an audio sensor, a position sensor, an action sensor, etc.

Also, for synchronization and search of the contents stored in the display device, the user input interface module 150 may receive predetermined synchronization target content, a selection signal of the display device for synchronization, a content keyword, and a synchronization command from the user.

The control module 170 demultiplexes an input stream and processes the demultiplexed stream through the tuner 110, the demodulation module 120 or the external device interface module 130 to generate and output a signal for a video and audio output.

The video signal processed by the control module 170 may be input to the display module 180, so that the video signal may be displayed as image corresponding to the video signal. Also, the video signal processed by the control module 170 may be input to the external output device through the external device interface module 135.

The video signal processed by the control module 170 may be output to the audio output module 185. Also, the video signal processed by the control module 170 may be input to the external output device through the external device interface module 135.

Although not shown in FIG. 6, the control module 170 may include a demultiplexer and a video processor, which will be described later with reference to FIG. 10.

In addition, the control module 170 controls overall operations of the display device 100. For example, the control module 170 may control the tuner 110 to tune RF broadcasting corresponding to the channel selected by the user or the previously stored channel.

Also, the control module 170 may control the display device 100 through a user command input through the user input interface module 150 or its internal program. In particular, the control module 170 may allow the user to access the network and download a desired application or a list of desired applications into the display device 100.

For example, the control module 170 controls the tuner 110 to input a signal of a channel selected in accordance with a predetermined channel selection command received through the user input interface module 150, and processes a video, audio or data signal of the selected channel. The control module 170 may allow the channel information selected by the user to be output through the display module 180 or the audio output module 185 together with the processed video or audio signal.

For another example, the control module 170 may allow a video signal or an audio signal from an external device, for example, camera or camcorder, which is input through the external device interface module 135, to be output through the display module 180 or the audio output module 185 in accordance with an external device video play command received through the user input interface module 150.

Also, the control module 170 may control the display device 100 through a user command input through the user input interface module 150 or its internal program. In particular, the control module 170 may allow the user to access the network and download a desired content or a list of contents into the display device 100.

In the meantime, the control module 170 may control the display module 180 to display video. For example, the control module 170 may control the display module 180 to display broadcasting image input through the tuner 110, external input image input through the external device interface module 135, image input through the network interface module, or image stored in the memory module 140. At this time, the image displayed in the display module 180 may be still image or moving image, and may be 2D image or 3D image.

In the meantime, if the control module 170 enters a contents viewing list, it may control the display module to display contents or a list of contents that can be downloaded in the display device 100 or from the external network.

Also, the control module 170 may play contents. At this time, the contents may be contents stored in display device 100, received broadcasting contents, or externally input contents. The contents may be at least one of broadcasting image, external input image, audio files, still image, accessed web screen, and document files.

According to the embodiment, the control module 170 may control the display module 180 to display a home screen in accordance with an input of movement to home screen.

The home screen may include a plurality of card objects sorted per content source. The card object may include at least one of a card object representing a thumbnail list of a broadcast channel, a card object representing a broadcast guide list, a card object representing a broadcasting reservation list or a broadcasting recording list, and a card object representing a media list within the display device or another device connected with the display device. Also, the card object may further include at least one of a card object representing a list of accessed external devices and a card object representing a list related with calls.

Also, the home screen may further include an application menu provided with at least one executable application list. If there is an input of card object movement, the control module 170 may control the display module 180 to display the corresponding card object through movement or move a card object not displayed in the display module 180 to the display module 180.

If a predetermined one of a plurality of card objects in the home screen is selected, the control module 170 may control the display module 180 to display image corresponding to the corresponding card object.

The control module 170 may control the display module 180 to display received broadcasting image and an object representing corresponding broadcasting image information in the card object displaying broadcasting image. The control module 170 may control the broadcasting image such that the size of the broadcasting image may be fixed by lock.

The control module 170 may control the display module 180 to display a setup object for at least one of video setup, audio setup, reservation setup, pointer setup of the remote controller, and network setup in the home screen.

The control module 170 may control the display module 180 to display an object of login, help message, or exit in a part of the home screen. Also, the control module 170 may control the display module 180 to display an object representing the number of all card objects or representing the number of card objects displayed in the display module 180 in a part of the home screen.

If a card object name of a predetermined one of card objects displayed in the display module 180 is selected, the control module 170 may control the display module 180 to display the corresponding card object as the whole screen.

Also, if an incoming call signal is received in the accessed external device or the display device, the control module 170 may control the display module 180 to focus and display a call related card object of a plurality of card objects or move the call related card object into the display module 180.

In the meantime, if the control module 170 enters an application viewing list, it may display an application or a list of applications that can be downloaded in the display device 100 or from the external network.

The control module 170 may control installation or driving of the application downloaded from the external network together with various user interfaces. Also, the control module 170 may control the display module 180 to display image related to the application implemented by selection of the user.

In the meantime, although not shown, a channel browsing processor that generates thumbnail image corresponding to a channel signal or external input signal may further be provided.

The channel browsing processor extracts image from the stream signal (TS) output from the demodulation module 120 or the stream signal output from the external device interface module 135 to generate thumbnail image. The thumbnail image may be input to the control module 170 as it is or encoded. Also, the generated thumbnail image may be encoded in a stream format and then input to the control module 170. Therefore, the control module 170 may display a thumbnail list that includes a plurality of thumbnail images, by using the input thumbnail image. The thumbnail images of the thumbnail list may be updated in due order or at the same time. Then, the user can simply recognize contents of a plurality of broadcast channels.

According to one embodiment, for synchronization of contents of the display device, if contents for synchronization and a selection signal of the display device for synchronization are received from the user through the user input interface module 150, the control module 170 transmits the selection signal to a predetermined server through the network interface module 130. If a comparison result of the list of contents is received from the server, the control module 170 transmits the contents corresponding to the comparison result to the server.

According to another embodiment, if contents for synchronization are received from the predetermined server through the network interface module 130, the control module 170 outputs a list of the received contents through the display module 180. If a synchronization confirmation command for the received contents is input from the user through the user input interface module 150, the control module 170 controls the memory module 140 to update the list of contents of memory module 140.

Also, if contents for synchronization are received from the predetermined server through the network interface module 130, the control module 170 outputs a notification message to a predetermined zone of the display module 180. If a confirmation command for the received contents is input from the user through the user input interface module 150, the control module 170 controls the display module 180 to output a list of the received contents.

Also, the control module 170 may control the display module 180 to output the notification message together with image data corresponding to the received contents or information on the number of the received contents.

The control module 170 may control the memory module 140 such that the list of the received contents may additionally include contents previously stored in the memory module 140. Also, the control module 170 may control the display module to respectively display the received contents and the contents previously stored in the memory module.

According to another embodiment, if a content search keyword and a selection signal of the display device for search are received from the user through the user input interface module 150, the control module 170 transmits the received search information to a predetermined server through the network interface module 130 and receives the search result from the server through the network interface module 130.

The display module 180 converts the video, data and OSD signals processed by the control module 170 or the video and data signals received from the external device interface module 135 to R, G, B signals, respectively, to generate driving signals. Examples of the display module 180 may include PDP, LCD, OLED, flexible display, and 3D display.

A touch screen may be used as the display module 180, whereby the display module may be used as an input module as well as an output module.

According to one embodiment, the display module 180 may output a user interface that includes contents or a list of contents for synchronization, which are stored in the memory module 140 for synchronization and search of contents, a contents synchronization menu, a synchronization notification message, and a contents search menu.

The audio output module 185 receives the signal audio-processed by the control module 170, for example, stereo signal, 3.1 channel signal or 5.1 channel signal, and outputs the received signal as sound. Various types of speakers may be used as the audio output module 185.

To sense a gesture of the user, the display device 100 may further include a sensing unit (not shown) that includes at least one of a touch sensor, an audio sensor, a position sensor, and an action sensor, as described above. The signal sensed by the sensing unit may be transmitted to the control module 170 through the user input interface module 150.

The display device 100 may further include a camera module (not shown) that takes a user. Image information taken by the camera module may be input to the control module 170.

The control module 170 may sense gesture of the user by using the image taken from the camera module (not shown) and the signal sensed from the sensing unit, respectively or in combination.

The power supply module 190 supplies the corresponding power to the whole portion of the display device 100. In particular, the power supply module 190 can supply the power to the control module 170 that can be implemented in the form of a system on chip (SOC), the display module 180 for image display, and the audio output module 185 for audio output.

To this end, the power supply module 190 may further include a converter (not shown) that converts alternating current to direct current. In the meantime, if the display module 180 is implemented as a liquid crystal panel that includes a plurality of back light lamps, for example, for luminance variable or dimming driving, the power supply module 190 may further include an inverter (not shown) that enables PWN operation.

The remote controller 200 transmits a user input to the user input interface module 150. To this end, the remote controller 200 can use Bluetooth, Radio Frequency (RF) communication, infrared (IR) communication, Ultra Wideband (UWB), ZigBee, etc. Also, the remote controller 200 can receive the video, audio or data signal output from the user input interface module 150 to display the received signal or output audio or vibration.

The aforementioned display device 100 may be a fixed type digital broadcast receiver that can receive at least one of digital broadcasting of ATSC mode (8-VSB mode), digital broadcasting of DVB-T mode (COFDM mode), and digital broadcasting of ISDB-T mode (BST-OFDM mode).

The block diagram in FIG. 2 corresponds to one of many embodiments. The respective elements of the block diagram may be incorporated, added or omitted depending on options of the display device 100 which is actually implemented. In other words, two or more elements may be incorporated into one element, or one element may be divided into two or more elements, as occasion demands.

In contrast to the embodiment in FIG. 6, display device 100 may receive and play video contents through the network interface module 130 or the external device interface module 135 without the tuner 110 and the demodulation module 120 illustrated in FIG. 6.

The display device 100 is an example of a video processor that performs signal processing of video stored therein or input video. Another examples of the video signal processor include a set-top box that excludes the display module 180 and the audio output module 185 illustrated in FIG. 6, the aforementioned DVD player, a blu-ray player, a game device, and a computer. Hereinafter, the set-top box will be described with reference to FIG. 7 and FIG. 8.

Figure 7:
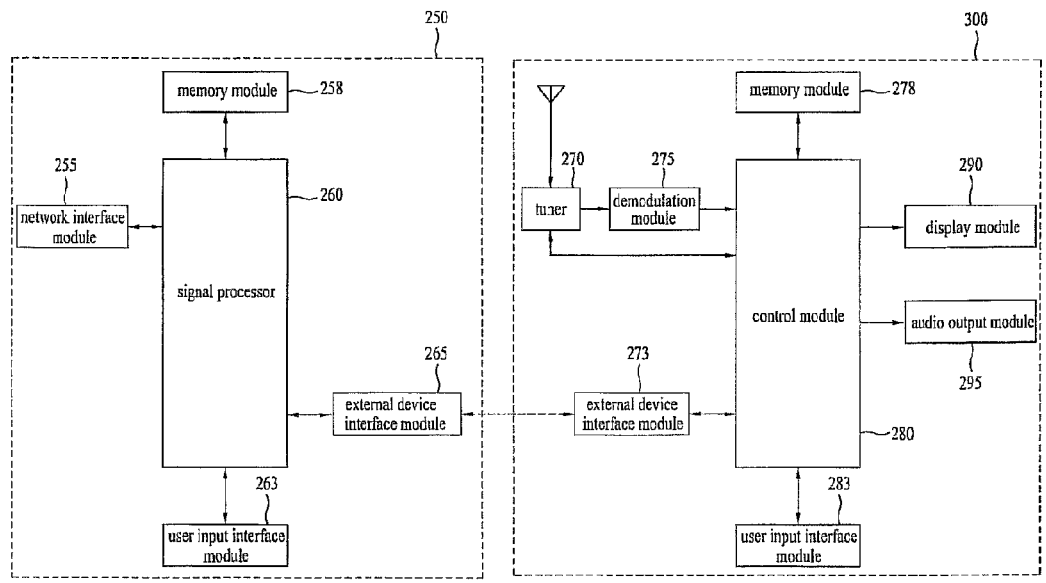
FIGS. 7 and 8 show a display device having or coupled to a set-top box.
Figure 8:
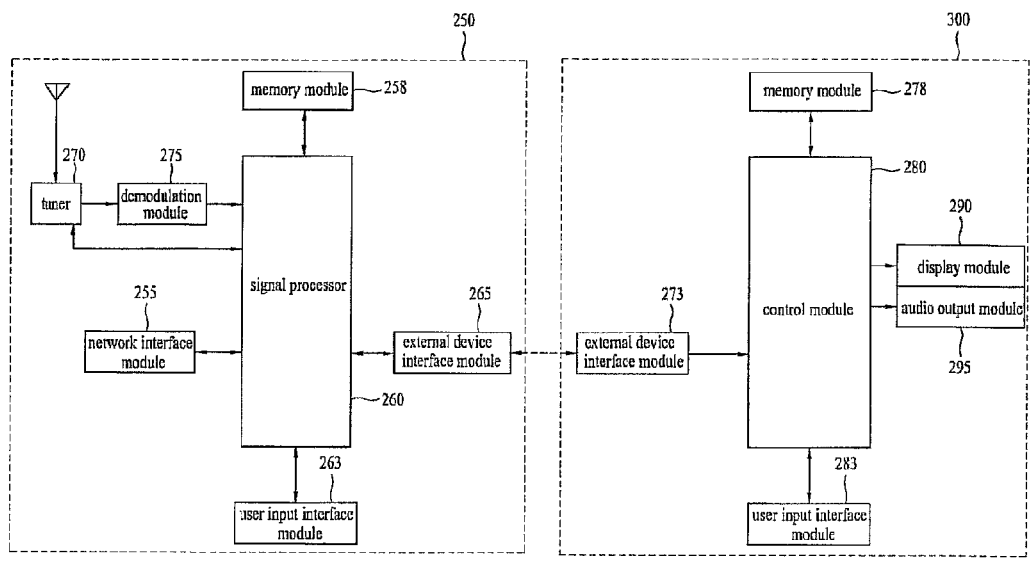

FIGS. 7 and 8 show a display device having or coupled to a set-top box. Referring to FIG. 7, a set-top box 250 and a displayer 300 can transmit or receive data through a wire or wireless cable. The set-top box 250 includes a network interface module 255, a memory module 258, a signal processor 260, a user input interface module 263, and an external device interface module 265.

The network interface module 255 provides an interface for connection with wire/wireless network including Internet network. Also, the network interface module 255 transmits or receives data to and from other users or other electronic devices through a network connected thereto or another network linked on the connected network.

The memory module 258 may store a program for processing and controlling each signal of the signal processor 260, or may temporarily store the video, audio or data signal input from the external device interface module 265 or the network interface module 255. Also, the memory module 258 may store a platform illustrated in FIG. 11 and FIG. 12 which will be described later.

The signal processor 260 performs signal processing of an input signal. For example, the signal processor 260 may demultiplex or decode the input video signal, or may demultiplex or decode the input audio signal. To this end, the signal processor 260 may further include a video decoder or an audio decoder. The video signal or audio signal subjected to signal processing can be transmitted to the displayer 300 through the external device interface module 265.

The user input interface module 263 transmits the signal input by the user to the signal processor 260 or transmits the signal from the signal processor 260 to the user. For example, the user input interface module 263 may receive various control signals such as power on/off, action input and setup input, which are input by a local key (not shown) or a remote controller 200, to transmit the control signals to the signal processor 260.

The external device interface module 265 provides an interface for transmitting or receiving data to and from an external device connected thereto through a wire or wireless cable. In particular, the external device interface module 265 provides an interface for transmitting or receiving data to and from the displayer 300. In addition, the external device interface module 265 may provide an interface for transmitting or receiving data to and from external devices such as game devices, cameras, camcorders, computers (e.g., notebook computers), etc.

In the meantime, the set-top box 250 may further include a media input module (not shown) for playing separate media. An example of the media input module includes a blu-ray input module (not shown). In other words, the set-top box 250 may include a blu-ray player. Media of the input blu-ray disk are subjected to signal processing such as demultiplexing or decoding by the signal processor 260 and then transmitted to the displayer 300 through the external device interface module 265, whereby the media are displayed in the displayer 300.

The displayer 300 includes a tuner 270, an external device interface module 273, a demodulation module 275, a memory module 278, a control module 280, a user input interface module 283, a display module 290, and an audio output module 295.

Since the tuner 270, the demodulation module 275, the memory module 278, the user input interface module 283, the display module 290, and the audio output module 295 correspond to the tuner 110, the demodulation module 120, the memory module 140, the user input interface module 150, the display module 180, and the audio output module 185, which are illustrated in FIG. 6, their description will be omitted.

The external device interface module 273 provides an interface for transmitting or receiving data to and from an external device connected thereto through a wire or wireless cable. In particular, the external device interface module 273 provides an interface for transmitting or receiving data to and from the set-top box 250.

Accordingly, the video signal or audio signal input through the set-top box 250 is output to the display module 180 or the audio output module 185 through the control module 170.

Referring to FIG. 8, the set-top box 250 and the displayer 300 are similar to those illustrated in FIG. 7 but are different from those illustrated in FIG. 7 in that the tuner 270 and the demodulation module 275 are located in the set-top box 250 not the displayer 300. Hereinafter, the set-top box 250 and the displayer 300 of FIG. 8 will be described based on the difference from FIG. 7.

The signal processor 260 performs signal processing of a broadcast signal received through tuner 270 and demodulation module 275. Also, the user input interface module 263 receives an input signal of channel selection, channel storage, etc.

Figure 9:
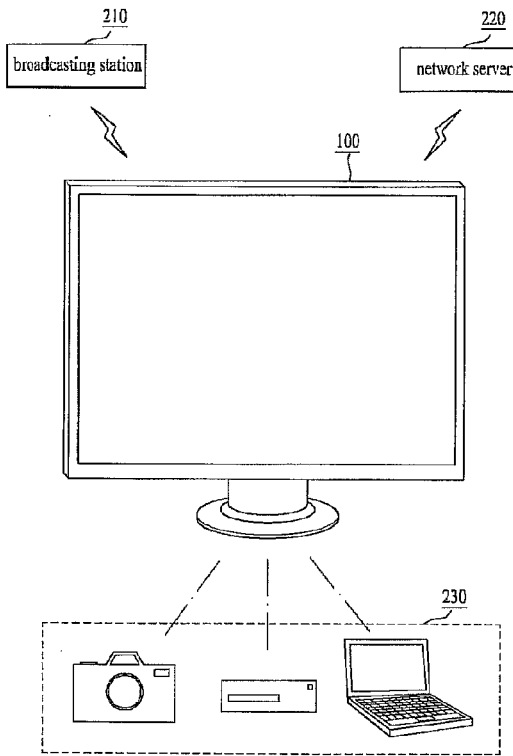
FIG. 9 shows communication between a display device and other devices.

FIG. 9 shows communication between a display device 100 and other devices. The display device in FIG. 9 may correspond to a display device according to any one of the aforementioned embodiments. As illustrated in FIG. 9, display device 100 according to one embodiment of the present invention can perform communication with a broadcasting station 210, a network server 220, or an external device 230.

The display device 100 receives a broadcast signal that includes a video signal transmitted from the broadcasting station 210. The display device 100 processes the video signal included in the broadcast signal and audio or data signal to be appropriately output from the display device 100. The display device 100 outputs video or audio based on the processed signal.

In the meantime, the display device 100 can perform communication with the network server. The network server 220 can transmit and receive a signal to and from the display device 100 through a random network. For example, the network server 220 may be a portable terminal that can be connected with the display device 100 through a wire or wireless base station. Also, the network server 220 may be a device that can provide contents to the display device 200 through Internet network. The content provider can provide contents to the display device by using the network server.

The display device 100 can perform communication with the external device 230. The external device 230 can directly transmit and receive a signal to and from the display device 100 through a wire or wireless cable. For example, the external device 230 may be a media memory device or a media player, which is used by the user. In other words, the external device 230 corresponds to a camera, a DVD player, a blu-ray player, or a personal computer.

The broadcasting station 210, the network server 220 or the external device 230 can transmit a signal, which includes a video signal, to the display device 100. The display device 100 can display video based on the video signal included in the input signal. Also, the display device 100 can transmit the signal, which is transmitted from the broadcasting station 210 or the network server 220 to the display device 100, to the external device 230. Also, the display device 100 can transmit the signal, which is transmitted from the external device 230 to the display device 100, to the broadcasting station 210 or the network server 220. In other words, the display device 100 serves to directly play and transmit the contents included in the signal transmitted form the broadcasting station 210, the network server 220 and the external device 230.

Figure 10:
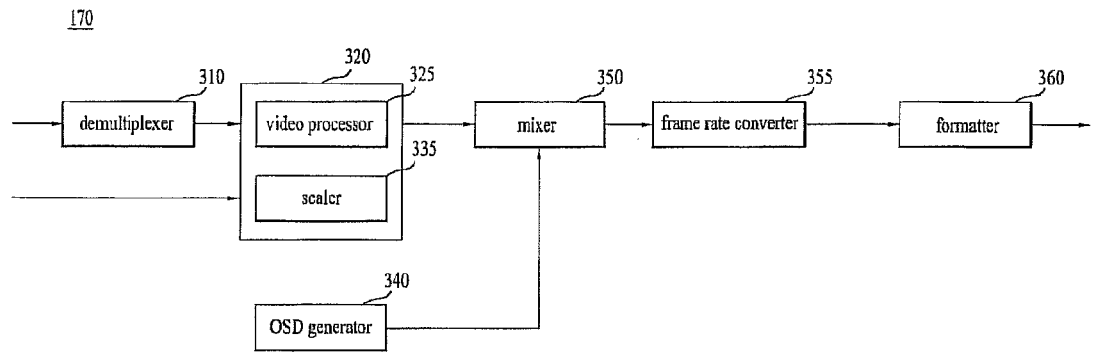
FIG. 10 shows one type of control module for a display device.

FIG. 10 shows one type of control module for a display device, which, for example, may correspond to one of the aforementioned embodiments. For illustrative purposes only, the device of FIG. 6 will be referenced.

This display device includes control module 170 having a demultiplexer 310, a video processor 320, an OSD generator 340, a mixer 350, a frame rate converter 355, and a formatter 360. The control module 170 may further include an audio processor (not shown) and a data processor (not shown).

The demultiplexer 310 demultiplexes input streams. For example, if MPEG-2 TS is input, the demultiplexer 310 demultiplexes the MPEG-2 TS and splits the demultiplexed MPEG-2 TS into a video signal, an audio signal and a data signal. In this case, the stream signal input to the demultiplexer 310 may be the stream signal output from the tuner 110, the demodulation module 120, or the external device interface module 135.

The video processor 320 can process the demultiplexed video signal. To this end, the video processor 320 includes a video decoder 325 and a scaler 335.

The video decoder 325 decodes the demultiplexed video signal, the scaler 335 performs scaling to output resolution of the decoded video signal through the display module 180.

Also, the video decoder 325 may include decoders having various specifications. For example, if the demultiplexed video signal is an encoded video signal of the MPEG-2 specification, it may be decoded by an MPEG-2 decoder.

Also, for example, if the demultiplexed video signal is an encoded video signal of the H.264 specification based on a Digital Multimedia Broadcasting (DMB) mode or DVB-H mode, it may be decoded by an H.264 decoder.

The video signal decoded by the video processor 320 is input to the mixer 350.

The OSD generator 340 generates an OSD signal in accordance with input of the user or by itself. For example, the OSD generator 340 may generate a signal for displaying various kinds of information on the screen of the display module 180 in the form of graphic or text based on the control signal from the user input interface module 150. The generated OSD signal may include various data such as a user interface screen of the display device 100, a screen of various menus, widget, and icon.

For example, the OSD generator 340 may generate a signal for displaying broadcast information based on EPG or caption of broadcast video.

The mixer 350 mixes the OSD signal generated by the OSD generator 340 with the decoded video signal processed by the video processor 220. The mixed signal is provided to the formatter 360. As the decoded broadcast video signal or the external input signal is mixed with the OSD signal, the OSD may be overlaid on the broadcast video or the external input video.

The frame rate converter (FRC) 355 converts a frame rate of the input video. For example, the frame rate converter 355 converts a frame rate of 60 Hz to a frame rate of 120 Hz or 240

Hz. If the frame rate converter 355 converts the frame rate of 60 Hz to the frame rate of 120 Hz, a first frame may be inserted between another first frame and the second frame, or a third frame predicted from the first frame and the second frame may be inserted between the first frame and the second frame.

If the frame rate converter 355 converts the frame rate of 60 Hz to the frame rate of 240 Hz, three same frames may be inserted between another first frame and the second frame, or the third frame predicted from the first frame and the second frame may be inserted between the first frame and the second frame. The input frame rate may be maintained without separate conversion.

The formatter 360 receives an output signal of the frame rate converter 355, changes a format of the signal to conform to the display module 180, and then outputs the changed format. For example, the formatter 360 may output R, G, B data signals. The R, G, B data signals may be output by low voltage differential signaling (LVDS) or mini-LVDS.

The audio processor (not shown) in the control module 170 may perform audio processing of the demultiplexed audio signal. To this end, the audio processor may include various decoders.

If the demultiplexed audio signal is an encoded audio signal, the audio processor in the control module 170 may decode the encoded audio signal. For example, the demultiplexed audio signal may be decoded by an MPEG-2 decoder, MPEG-4 decoder, AAC decoder, or AC-3 decoder. Also, the audio processor in the control module 170 can process base, treble and sound volume control.

The data processor (not shown) in the control module 170 can perform data processing of the demultiplexed data signal. If the demultiplexed data signal is an encoded data signal, the data processor in the control module 170 may decode the encoded data signal. The encoded data signal may be electronic program guide (EPG) information that includes broadcast information such as start time and end time of a broadcast program broadcasted from each channel. For example, the EPG information may be ATSC-Program and System information protocol (ATSC-PSIP) information in case of the ATSC mode, and may include DVB-Service Information (DVB-SI) in case of the DVB mode.

The ATSC-PSIP information or the DVB-SI information may be information included in the aforementioned stream, i.e., a header (4 byte) of the MPEG-2 TS.

The block diagram of control module 170 in FIG. 10 is but for one embodiment. Other modules or elements may be used or added to the respective elements of this block diagram in accordance with an intended application, or one or more elements or modules 10 may be omitted.

Figure 11:
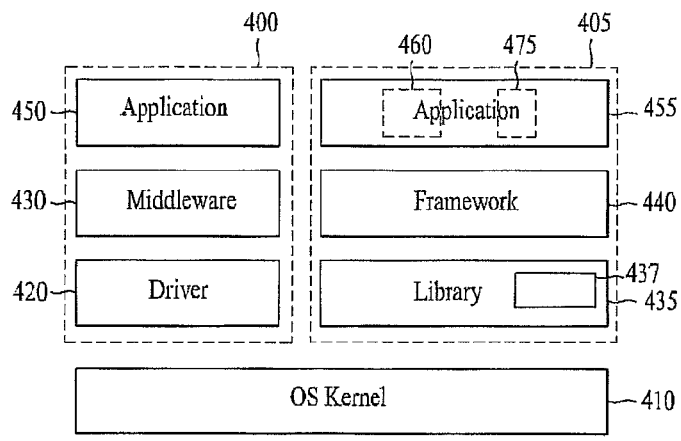
FIG. 11 shows an example of a platform structure for a display device.
Figure 12:
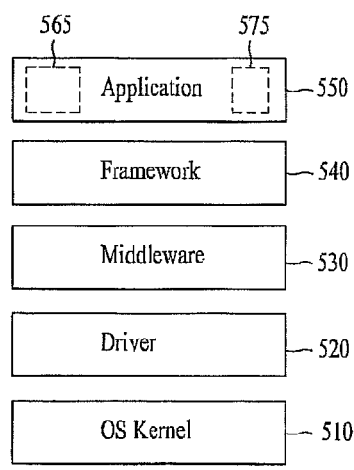
FIG. 12 shows another example of a platform structure.

FIG. 11 shows an example of a platform structure for a display device, and FIG. 12 shows another example of a platform structure. A platform of any one of the display devices according to the embodiments herein may include operating system (OS)-based software to perform the aforementioned various operations.

Referring to FIG. 11, a split-type platform is designed in such a manner that it is split into a legacy system platform 400 and a smart system platform 405. An OS kernel 410 may be used in common for the legacy system platform 400 and the smart system platform 405. The legacy system platform 400 includes a driver 420 on the OS kernel 410, a middleware 430, and an application layer 450.

The smart system platform 405 includes a library 435 on the OS kernel 410, a framework 440, and an application layer 455.

The OS kernel 410 is a core of the operating system, and can perform at least one of driving of a hardware driver, security of hardware and processor in the display device, efficient management of system resources, memory management, interface for hardware based on hardware abstraction, multi-process, and schedule management based on multi-process when the display device is driven. In the meantime, the OS kernel 410 may further perform power management.

The hardware driver in the OS kernel 410, for example, may include a display driver, a Wi-Fi driver, a Bluetooth driver, a USB driver, an audio driver, a power manager, a binder driver, and a memory driver.

Also, the hardware driver in the OS kernel 410 may further include a character device driver, a block device driver, and a network device driver as drivers for hardware devices therein. The block device driver may need a buffer equivalent to unit size in accordance with data transmission of a specific block unit. The character device driver may not need a buffer due to data transmission in a basic data unit, i.e., character unit.

The OS kernel 410 can be implemented as the kernel based on various operating systems such as unix (linux) based operating system and window based operating system. Also, the OS kernel 410 is an opened OS kernel, and can be used generally by other electronic devices.

The driver 420 is located between the OS kernel 410 and the middleware 430, and drives the device for operation of the application layer 450 together with the middleware 430. For example, the driver 420 may include drivers such as a micom in the display device, a display module, a graphic processing unit (GPU), a frame rate converter (FRC), a general purpose input/output pin (GPIO), HDMI, system decoder or demultiplexer (SDEC), video decoder (VDEC), audio decoder (ADEC), a personal video recorder (PVR), and an inter-integrated circuit (I2C). These drivers interact with the hardware driver in the OS kernel 410.

Also, the driver 420 may further include a driver of a remote controller 200, especially a spatial remote controller which will be described later. The driver of the spatial remote controller may be provided in the OS kernel 410 or the middleware 430 in addition to the driver 420.

The middleware 430 is located between the OS kernel 410 and the application layer 450, and serves as a medium that allows data to be exchanged between hardware and software. In this case, a standardized interface can be provided, various environments can be supported, and mutual interaction between tasks of different systems can be performed.

Examples of the middleware 430 in the legacy system platform 400 include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The application layer 450 on the middleware 430, namely the application layer 450 in the legacy system platform 400 may include a user interface application on various menus in the display device. The application layer 450 on the middleware 430 can be edited by selection of the user, and can be updated through the network. This application layer 450 enables the user to input a desired menu of various user interfaces in accordance with input of the remote controller during viewing broadcasting image.

Also, the application layer 450 in the legacy system platform 400 may further include at least one of TV guide application, Bluetooth application, reservation application, digital video recorder (DVR) application, hot key application.

In the meantime, the library 435 in the smart system platform 405 is located between the OS kernel 410 and the framework 440, and can form the base of the framework 440. For example, the library 435 includes security library, web engine library and media library, wherein the security library includes secure socket layer (SSL), the web engine library includes WebKit, libc (c library), and video and audio formats, and the media library includes media framework. The library 435 can be made based on C or C++, and can be exposed to a developer through the framework 440.

The library 435 may include a runtime 437 that includes a core java library and a virtual machine (VM). The runtime 437 forms the base of the framework 440 together with the library 435.

The virtual machine (VM) may be a virtual machine that enables a plurality of instances, i.e., multi-tasking. The virtual machine (VM) may be allocated in accordance with each application in the application layer 455. At this time, for schedule adjustment and interconnection between the plurality of instances, the binder driver (not shown) in the OS kernel 410 may be driven.

In the meantime, the binder driver and the runtime 437 can connect java based application with C based library. The binder driver and the runtime 437 can correspond to middleware of the legacy system.

The framework 440 in the smart system platform 405 includes a program based on the application in the application layer 455. The framework 440 is compatible with any one of the applications and enables reuse, movement or exchanges of components. The framework 440 may include a support program, and a program that compiles other software elements. For example, the framework 440 may include a resource manager, an activity manager related to activities of the application, a notification manager, and a content provider for briefing of information shared between the applications. The framework 440 can be made based on JAVA.

The application layer 455 on the framework 440 includes various programs that can be driven and displayed in the display device 100. For example, the application layer 455 may include core application that includes at least one of email, short message service (SMS), calendar, map, and browser. This application layer 455 can be made based on JAVA.

Also, the application layer 455 can be divided into application 465 that can be stored in the display device 100 and cannot be deleted by the user and application 475 that can be downloaded through the external device or network and can freely be installed or deleted by the user.

Internet phone service, video on demand (VOD) service, web album service, social networking service (SNS), location based service (LBS), map service, web search service and application search service may be performed by network access through the application in the application layer 455. Also, various functions such as games and schedule management may be performed through the application in the application layer 455.

Referring to FIG. 12, an integrated-type platform includes an OS kernel 510, a driver 520, a middleware 530, a framework 540, and an application layer 550. The platform of FIG. 12 is different from that of FIG. 11 in that the library 435 in FIG. 11 is omitted and application layer 550 is an integrated layer. The driver 520 and the framework 540 may correspond to those of FIG. 11.

The platform of FIG. 12 may be designed such that the library 435 illustrated in FIG. 11 is incorporated into the middleware 530 in FIG. 12. In other words, the middleware 530 includes legacy system middleware and display system middleware.

The legacy system middleware may include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The display system middleware may include security library, web engine library and media library, wherein the security library includes secure socket layer (SSL), the web engine library includes WebKit, libc, and the media library includes media framework. The display system middleware may further include runtime described above.

The application layer 550 in the legacy system may include menu application, TV guide application, and reservation application while the application layer 55 in the display system may include email, short message service (SMS), calendar, map, and browser.

Also, the application layer 550 may be divided into application 565 that can be stored in the display device 100 and cannot be deleted by the user and application 575 that can be downloaded through the external device or network and can freely be installed or deleted by the user.

Based on the aforementioned platforms of FIG. 11 and FIG. 12, various API (Application Programming Interface) and SDK (Software Development Kit) can be opened for an application development. In the future or present time. Moreover, API can be implemented by calling the function that provides a connection to specific subroutine for implementation in a program.

For example, Those API and SDK can be opened by a source involved with a hardware driver in OS kernel 410 such as display driver, Wi-Fi driver, Bluetooth driver, USB driver, or Audio driver.

According to another embodiment, those API and SDK can be opened by a related source in a driver 420 such as a micom in the display device, a display module, a graphic processing unit (GPU), a frame rate converter (FRC), system decoder or demultiplexer (SDEC), video decoder (VDEC), audio decoder (ADEC), a spatial remote controller and so on.

According to another embodiment, those API and SDK can be opened by a related source such as PSIP involved with broadcasting information, SI middleware or DLNA middleware.

Developers skilled in the art can develop at least one of application that is used for display device 100 control or ran in display device 100 based on the aforementioned platforms of FIG. 11 and FIG. 12 by using those various open API.

The aforementioned platforms of FIG. 11 and FIG. 12 can be used generally for various electronic devices as well as the display device. In the meantime, the platforms of FIG. 11 and FIG. 12 may be stored or loaded in the memory module 140 or the control module 170 illustrated in FIG. 6 or a separate processor (not shown). Also, the platforms of FIG. 11 and FIG. 12 may be stored or loaded in the SI&Metadata DB 711, the UI manager 714 or the service manager 713 illustrated in FIG. 7. Also, a separate application processor (not shown) for implementing application may further be provided.

Figure 13:
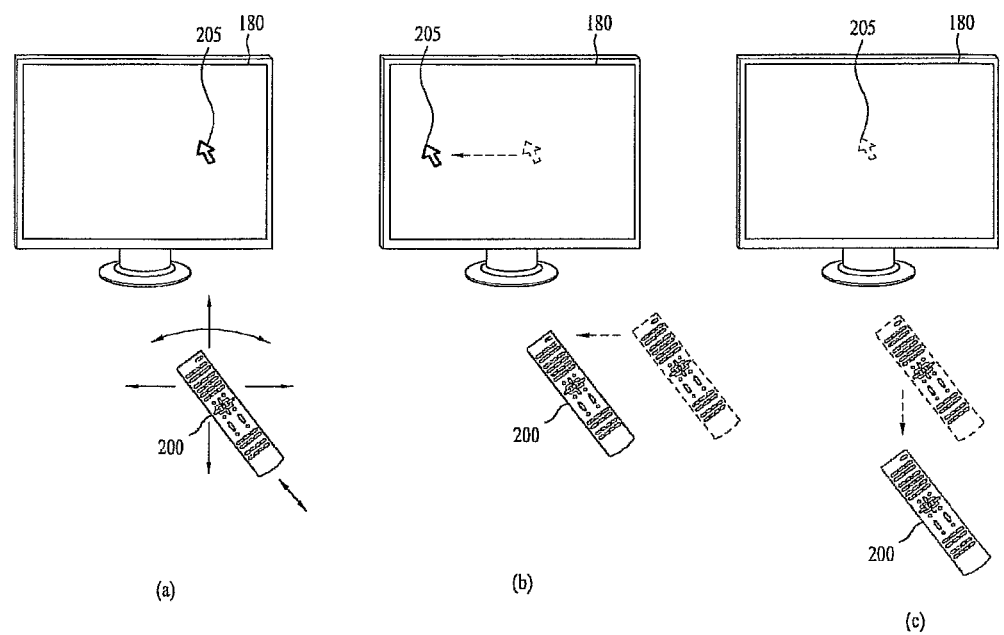
FIG. 13 shows one type of remote controller for a display device.

FIG. 13 shows one type of remote controller for a display device. As illustrated in (a) of FIG. 13, a pointer 205 corresponding to the remote controller 200 is displayed in the display module 180.

The user can move or rotate the remote controller 200 in up and down direction and left and right direction (b of FIG. 13)

and in front and rear direction (c of FIG. 13). The pointer 205 displayed in the display module 180 of the display device corresponds to movement of the remote controller 200. Since the remote controller 200 moves to the corresponding pointer 205 in accordance with movement on 3D space as shown, it may be referred to as a spatial remote controller.

FIG. 13(b) illustrates that, if the user moves the remote controller 200 to the left, the pointer 205 displayed in the display module 180 of the display device moves to the left correspondingly.

Information on movement of the remote controller 200, which is sensed by a sensor of the remote controller 200, is transmitted to the display device. The display device can obtain a coordinate of the pointer 205 from the information on movement of the remote controller 200. The display device can display the pointer 205 to correspond to the above coordinate.

FIG. 13(c) illustrates that the user moves the remote controller 200 to be far away from the display module 180 in a state that the user pushes a specific button of the remote controller 200. In this case, a zone selected in the display module 180 corresponding to the pointer 205 is displayed through zoom-in. On the contrary, if the user moves the remote controller 200 to be close to the display module 180, the zone selected in the display module 180 corresponding to the pointer 205 is displayed through zoom-out.

If the remote controller 200 becomes far away from the display module 180, the selected zone may be subjected to zoom-out. If the remote controller 200 becomes close to display module 180, the selected zone may be subjected to zoom-in.

In a state that the specific button of the remote controller 200 is pushed, up and down movement and left and right movement may not be recognized. In other words, if the remote controller 200 moves to be far away from or close to the display module 180, front and rear movement may be recognized only without recognition of up and down movement and left and right movement. In a state that the specific button of the remote controller 200 is not pushed, the pointer 205 is only moved in accordance with up and down movement and left and right movement of the remote controller 200.

Movement speed or movement direction of the pointer 205 may correspond to that of the remote controller 200. In this specification, the pointer means may, in one exemplary application, refer to an object displayed in the display module 180 to correspond to action of the remote controller 200.

Accordingly, in addition to an arrow shape illustrated by the pointer 205, various shaped objects may be provided. Examples of the pointer may include dot, cursor, prompt, and thick outline. The pointer may be displayed to correspond to any one point of a horizontal axis and a vertical axis on the display module 180, or may be displayed to correspond to a plurality of points such as line and surface.

Figure 14:
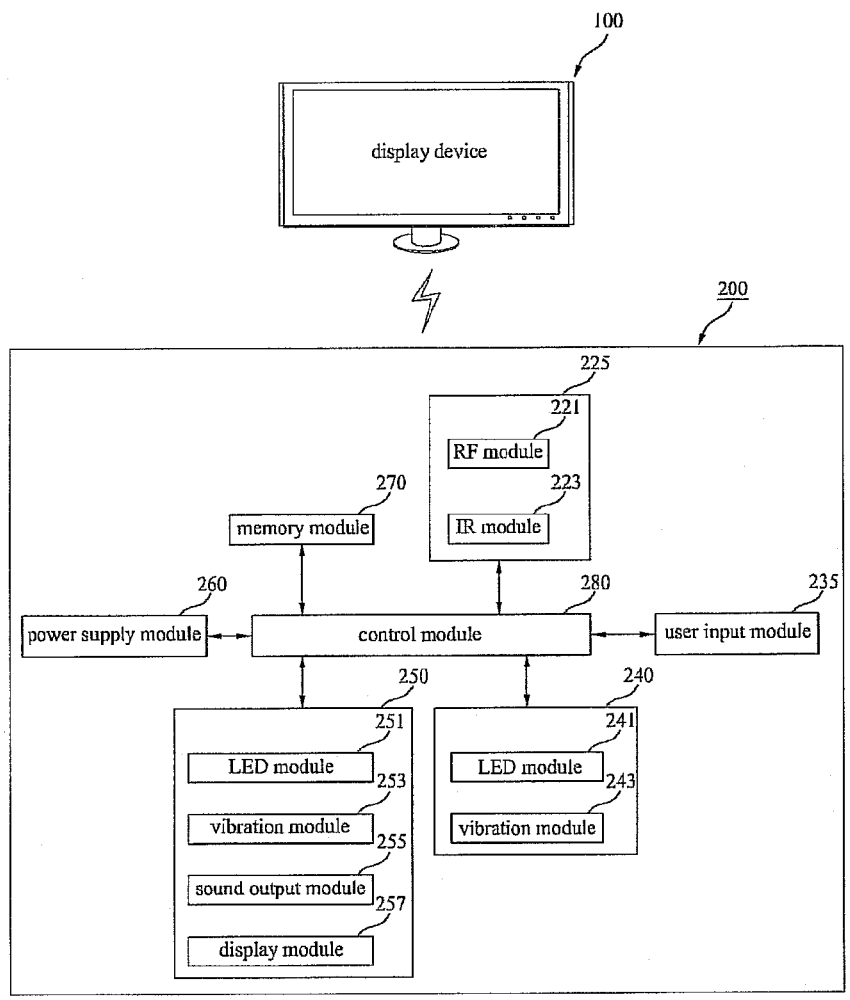
FIG. 14 shows one possible configuration of a remote controller.

FIG. 14 shows one possible configuration of a remote controller 200 which includes a wireless communication module 225, a use input module 235, a sensor module 240, an output module 250, a power supply module 260, a memory module 270, and a control module 280.

The wireless communication module 225 transmits and receives a signal to and from any one of the aforementioned display devices according to the embodiments of the present invention. One 100 of the display devices according to the embodiments of the present invention will be described exemplarily.

In this embodiment, the remote controller 200 may include RF module 221 that can transmit and receive a signal to and from the display device 100 in accordance with the RF communication standard. The remote controller 200 may further include IR module 223 that can transmit and receive a signal to and from the display device 100 in accordance with the IR communication standard.

In this embodiment, the remote controller 200 transmits a signal, which includes information on its movement, to the display device 100 through the RF module 221.

The remote controller 200 can receive the signal transmitted from the display device 100 through the RF module 221. Also, the remote controller 200 can transmit a command on power on/off, channel change and volume change to the display device 100 through the IR module 223.

The user input module 235 can include a key pad, a button, a touch pad, or a touch screen. The user can input the command related to the display device 100 to the remote controller 200 by manipulating the user input module 235. If the user input module 235 includes a hard key button, the user can input the command related to the display device 100 to the remote controller 200 through a push action of the hard key button.

If the user input module 235 includes a touch screen, the user can input the command related to the display device 100 to the remote controller 200 by touching a soft key of the touch screen.

Also, the user input module 235 may include various kinds of input means, which can be manipulated by the user, such as scroll key and jog key, within the range that does not limit the scope of the present invention.

The sensor module 240 may include a gyro sensor 241 or an acceleration sensor 243. The gyro sensor 241 can sense the information on movement of the remote controller 200. For example, the gyro sensor 241 can sense the information on movement of the remote controller 200 based on x, y and z axes. The acceleration sensor 243 can sense information on movement speed of the remote controller 200. In the meantime, the sensor module 240 may further include a distance sensor that senses the distance between the display module 180 and the remote controller 200.

The output module 250 can output the video or audio signal corresponding to the manipulation of the user input module 235 or the signal transmitted from the display device 100. The user can recognize whether the user input module 235 has been manipulated or whether the display device 100 has been controlled, through the output module 250.

For example, if the user input module 235 is manipulated or if the output module 250 transmits and receives a signal to and from the display device 100 through the wireless communication module 225, the output module 250 may include an LED module 251 for lighting, a vibration module 253 that generates vibration, a sound output module 255 that outputs sound, or a display module 257 that outputs image.

The power supply module 260 supplies the power to the remote controller 200. If the remote controller 200 does not move for a predetermined time, the power supply module 260 can save the power by stopping power supply. The power supply module 260 can resume power supply if a predetermined key provided in the remote controller 200 is manipulated.

The memory module 270 may store various kinds of programs and application data required for control or operation of the remote controller 200. If the remote controller 200 transmits and receives a signal to and from the display device 100 through the RF module 221, the remote controller 200 and the display device 100 transmit and receive the signal to and from each other through a predetermined frequency band. The control module 280 of the remote control module 200 can store information on the frequency band, which can be transmitted and received to and from the display device 100 paired with the remote controller 200, and can refer to the stored information.

The control module 280 controls all matters related to control of the remote controller 200. The control module 280 can transmit the signal corresponding to predetermined key manipulation of the user input module 235 or the signal corresponding to movement of the remote controller 200, which is sensed by the sensor module 240, to the display device through the wireless communication module 225.

FIGS. 15-18 show examples of a user interface for a display device.

Figure 15:
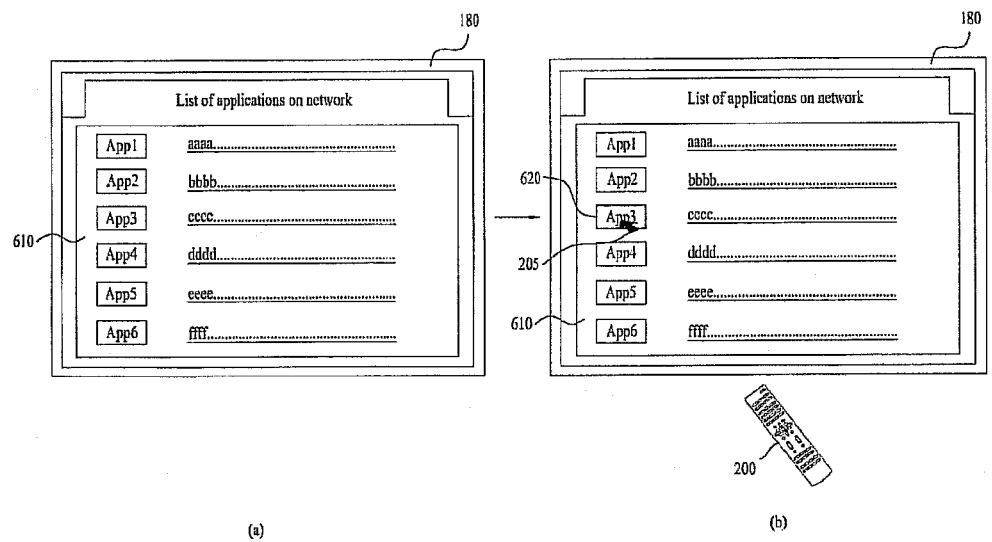
FIG. 15 shows a first example of a user interface for a display device.

In FIG. 15, the list of applications on the network is displayed in the display module 180. In other words, the user can search and download various applications by directly accessing the corresponding content server or network server.

In FIG. 15(a), a list 610 of various applications in the accessed server is displayed in the display module 180. The list 610 of applications may include icon representing each application and brief information on each application. In the meantime, since the display device according to the embodiments of the present invention enables full browsing, it can display the icon or brief information received from the server through zoom-in. In this case, the user can easily identify the list of applications. This will be described later.

In FIG. 15(b), any one 620 of the list 610 of applications is selected using the pointer 205 of the remote controller 200. In this case, the corresponding application can be downloaded conveniently.

Figure 16:
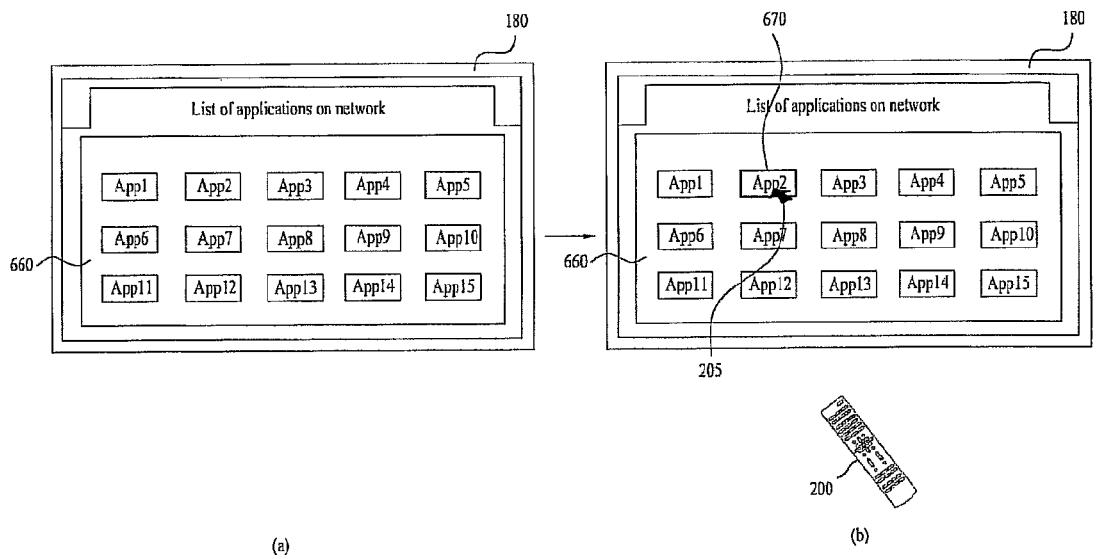
FIG. 16 shows a second example of a user interface for a display device.

FIG. 16 illustrates that the list of applications in the display device is displayed in the display module 180. In FIG. 16(a), if the user views the list of applications by manipulating the remote controller 200, the list 660 of applications stored in the display device according to the embodiments of the present invention is displayed in the display module 180. Although the icons representing each application are only shown in the drawing, the present invention is not limited to the icons. The list of applications may include the brief information on each application as illustrated in FIG. 15, whereby the user can easily identify the list of applications.

In FIG. 16(b), any one 670 of the corresponding list 660 of applications is selected using the pointer 205 of the remote controller 200. In this case, the corresponding application can be implemented conveniently.

In order to select a predetermined item, the pointer 205 moves in accordance with movement of the user by using the remote controller 200 illustrated in FIG. 15 and FIG. 16. Also, in the embodiment of the present invention, various examples for selecting a predetermined item may be provided. For example, a cursor displayed on the screen by combination of a directional key and a confirmation key, which are arranged in a local key (not shown) or the remote controller 200, may be used to select a predetermined item.

For another example, if the remote controller 200 includes a touch pad, the pointer 205 is moved on the display module 180 by touch action of the touch pad. In this way, a predetermined item may be selected.

Figure 17:
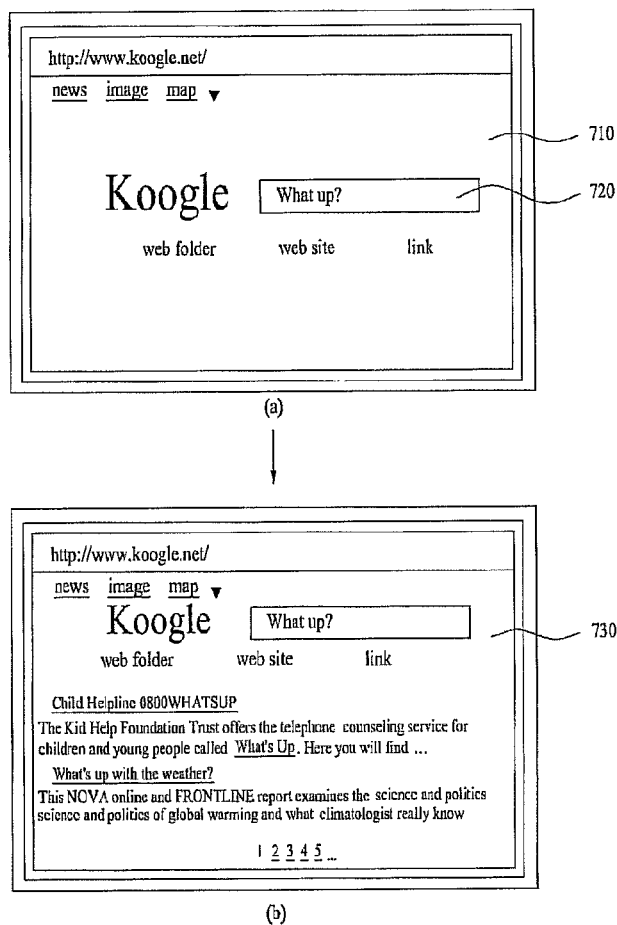
FIG. 17 shows a third example of a user interface for a display device.

FIG. 17 illustrates that a web screen is displayed in the display module of the display device. In FIG. 17(a), a predetermined web screen 710 that includes a search window 720 is displayed in the display module 180. The user can input a predetermined text in the search window 720 by using a key pad (not shown) displayed on the screen, a text key (not shown) provided in a local key (not shown), or a text key (not shown) provided in the remote controller.

FIG. 17(b) illustrates that a search result screen 730 according to a search keyword input to the search window is displayed in the display screen 180. Since the display device according to the embodiment of the present invention enables full browsing, the user can easily identify the web screen.

Figure 18:
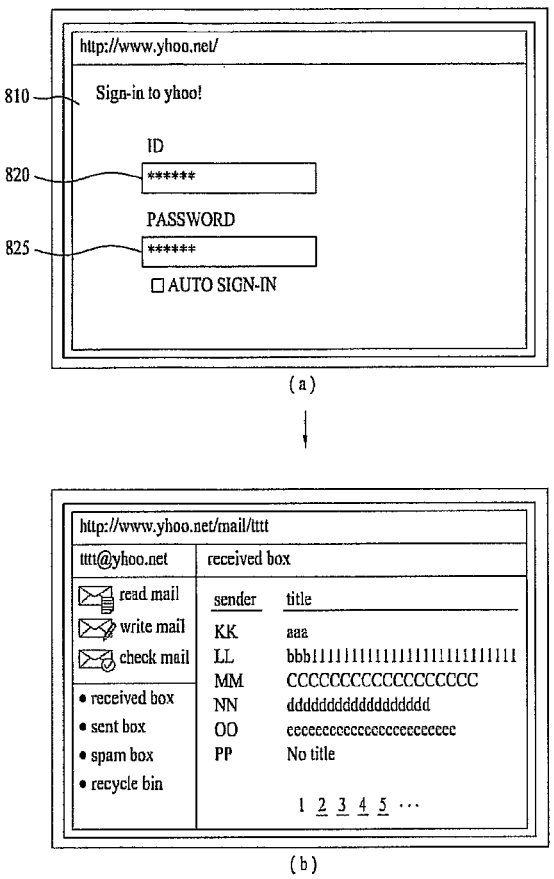
FIG. 18 shows a fourth example of a user interface for a display device.

FIG. 18 illustrates that a web screen is displayed in the display portion of the display device. In FIG. 18(a), a mail service screen 810 having an ID input window 820 and a password input window 825 is displayed in the display module 180. The user can input a predetermined text in the ID input window 820 and the password input window 825 by using a key pad (not shown) displayed on the screen, a text key (not shown) provided in a local key (not shown), or a text key (not shown) provided in the remote controller. Accordingly, the user can log in the corresponding mail service.

In FIG. 18(b), a screen 830 after log in mail service is displayed in the display module 180. For example, 'read mail' item, 'write mail' item, 'sent box' item, 'received box' item, and 'recycle bin' item may be displayed in the display module. Also, the 'received box' item may be divided into 'sender' item and 'title' item. In this way, the received mails may be arranged and displayed in the display module 180.

Since the display device according to the embodiment of the present invention enables full browsing when the screen for mail service is displayed, the user can use the mail service conveniently.

Figure 19:
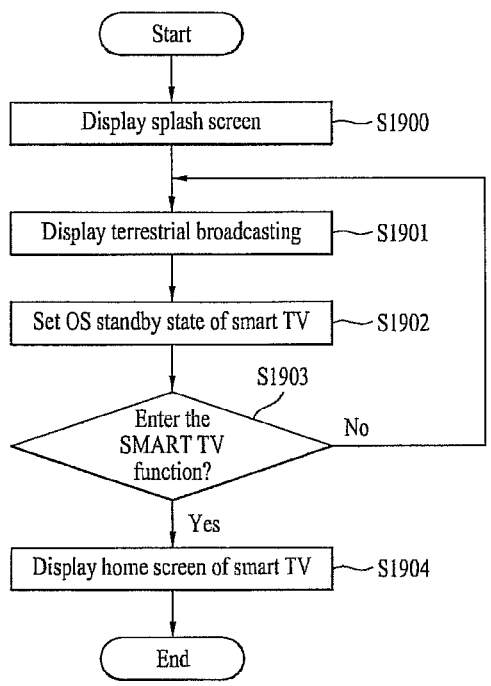
FIG. 19 shows one embodiment of a procedure for booting the operating system of a smart TV.

FIG. 19 shows one embodiment of a procedure for booting the operating system of a smart TV. According to this embodiment, if a power source is applied to the display apparatus, a central process unit (CPU) of the display apparatus displays a splash screen by first driving a graphic zone of a graphic process unit (GPU) (S1900).

Since the graphic zone of the GPU can be driven faster than NTSC/ATSC action zone of the display apparatus, a splash screen is first displayed before a terrestrial screen is displayed, whereby boredom of a booting time can be reduced.

According to one embodiment, the splash screen can be varied by setup. In other words, the splash screen could be any one or more of a photo taken by a digital camera, a photo taken by a mobile phone, and a capture screen captured in the middle of TV watching, depending on user setup. The splash screen will be described in detail with reference to FIG. 23.

Also, a plurality of photos can be customized in such a manner that they are set as the splash screen to display different photos whenever booting is performed.

Next, if it is completely ready for driving of the NTSC/ATSC action zone, the NTSC/ATSC action zone is driven to display a terrestrial broadcast screen (S1901).

In order to complete booting of the operating system for using functions of the smart TV, a predetermined booting time is required. Since the driving time of the NTSC/ATSC action zone for displaying the terrestrial broadcast screen is shorter than the booting time of the operating system, the terrestrial broadcast screen is displayed to reduce an experience standby time.

According to one embodiment, a channel of the terrestrial broadcast screen displayed at the standby time can be varied depending on user setup. The terrestrial broadcast screen will be described later in detail with reference to FIG. 24.

Next, if booting of the operating system for using functions of the smart TV is completed, the operating system is operated on background and then set to the standby state (S1902).

According to one embodiment, in a state that the operating system is on standby on background, a predetermined message can be displayed for the user. Also, at the same time when booting of the operating system is completed, the home screen of the smart TV may be displayed to immediately use the functions of the smart TV.

Next, it is determined whether a signal for entering smart TV function is received from the user (S1903).

Next, if the signal for entering smart TV function is received from the user, the operating system is driven to display a home screen of the smart TV (S1904).

According to one embodiment, the user can input the signal for entering smart TV function by using various user input interface means, and the display apparatus displays the home screen at the same time when the entry signal is received. Also, the home screen may be customized depending on user setup.

Through the above steps, the user can wait for the standby time for using the functions of the smart TV without boredom.

Figure 20:
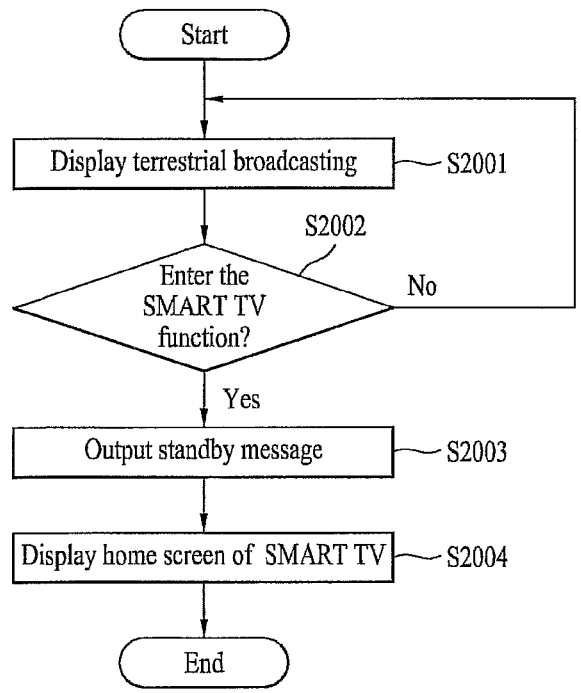
FIG. 20 shows another embodiment of a procedure for booting the operating system of a smart TV.

FIG. 20 shows another embodiment of a procedure for booting the operating system of a smart TV. According to this embodiment, unlike FIG. 19, the user can input the signal for entering smart TV function (S2002) while watching a predetermined terrestrial broadcast screen through the display apparatus (S2001). Also, in this case, unlike FIG. 19, since the NTSC/ATSC action zone has been already operated, the splash screen is not displayed.

If the entry signal is input, the display apparatus can display a predetermined message indicating that the operating system for using functions of the smart TV is being booted (S2003). Also, the message can include an expected standby time to reach booting completion. In this case, the user can identify that the entry signal is normally input and booting is being performed.

Next, if the operating system is completely booted, the operating system is driven to display the home screen of the smart TV (S2004). The home screen can be customized depending on user setup.

Through the above steps, the experience standby time can be minimized to reduce inconvenience even if the user intends to use the functions of the smart TV while watching the terrestrial broadcasting through the display apparatus.

Figure 21:
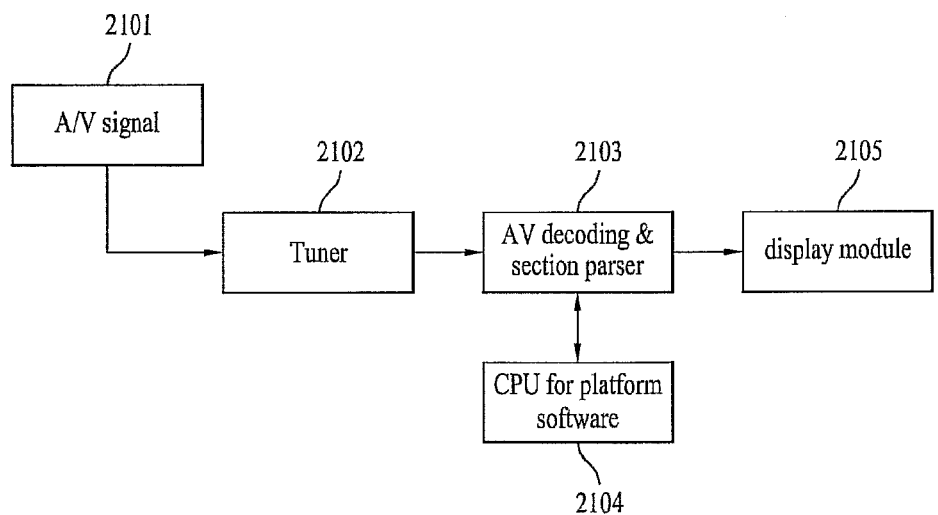
FIG. 21 shows one embodiment of a display device which capable of being booted with a smart TV operating system.

FIG. 21 shows one embodiment of a display device which capable of being booted with a smart TV operating system. According to this embodiment, in order to use all services of the smart TV, the operating system (OS) that can be linked to a web should be loaded into a system memory. Since the home screen of the smart TV is not provided to the user for the time when the operating system is loaded into the system memory, reset and stabilized, the display apparatus is disabled for several tens of seconds depending on its type.

Accordingly, as illustrated in FIG. 21, the terrestrial screen is displayed for the time when the display apparatus is disabled. Referring to FIG. 21, the display apparatus includes an AV decoding & section parser (hereinafter, referred to as 'first module') 2103 and a CPU for platform software (hereinafter, referred to as 'second module') 2104.

The first module is for displaying a terrestrial screen, and the second module is for driving the operating system of the smart TV.

Accordingly, even though the operating system of the smart TV is not driven, the first module receives an AV signal 2101 from a tuner 2102 and transmits a terrestrial broadcast signal to a display module, whereby the display module 2105 of the display apparatus can display terrestrial broadcasting.

Also, since the first module and the second module can transmit and receive data to and from each other, if predetermined functions are required to use the functions of the smart TV, the second module can transmit a command to the first module, and the first module can report its state to the second module and transmit a response to the command to the second module.

Accordingly, while the booting procedure is being performed by the second module as illustrated in FIG. 21, the first module can display terrestrial broadcasting.

Also, since the CPU of the smart TV requires much power than that of a general TV, if the two modules perform AV decoding and platform software task, respectively, overall throughput can be improved and operation speed can also be improved, whereby services can actively be provided to the user.

Figure 22:
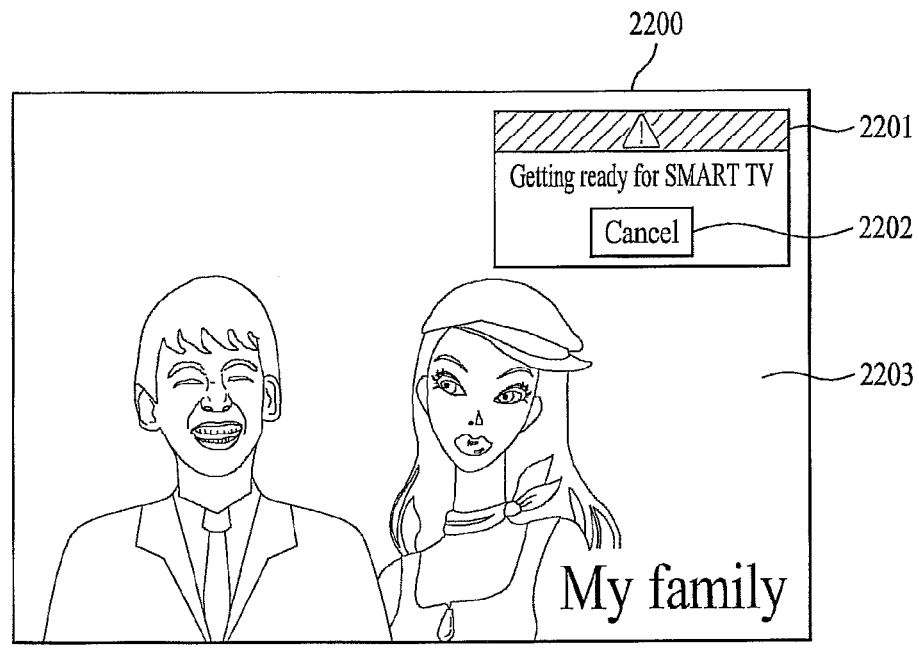
FIG. 22 shows one embodiment of a screen containing a message displayed during booting of a smart TV operating system.

FIG. 22 shows one embodiment of a screen containing a message displayed during booting of a smart TV operating system. According to this embodiment, if a power source is applied to the display apparatus, a central process unit (CPU) of the display apparatus displays a splash screen 2203 by first driving a graphic zone of a graphic process unit (GPU).

Also, image displayed on the splash screen is stored in CMOS RAM of the display apparatus. The image can promptly be loaded and displayed if the power source is applied to the display apparatus.

As illustrated in FIG. 22, the splash screen may be displayed to include a predetermined image, and may be displayed to include a message 2201 indicating that the smart TV is being booted. In this case, since the user can view predetermined photos through the splash screen during booting, boredom that may occur during the booting procedure can be reduced.

Also, according to one embodiment, the message indicating that the smart TV is being booted can include a number or graph image indicating a predetermined time required to reach booting completion.

Also, the predetermined image can be varied depending on user setup. Also, the predetermined image can be displayed in such a manner that several photos are together displayed or sequentially displayed in the form of slide show.

Also, the user can stop loading of the operating system of the smart TV and set a mode for watching terrestrial broadcasting only by inputting a signal for selecting a predetermined menu item 2202.

Figure 23:
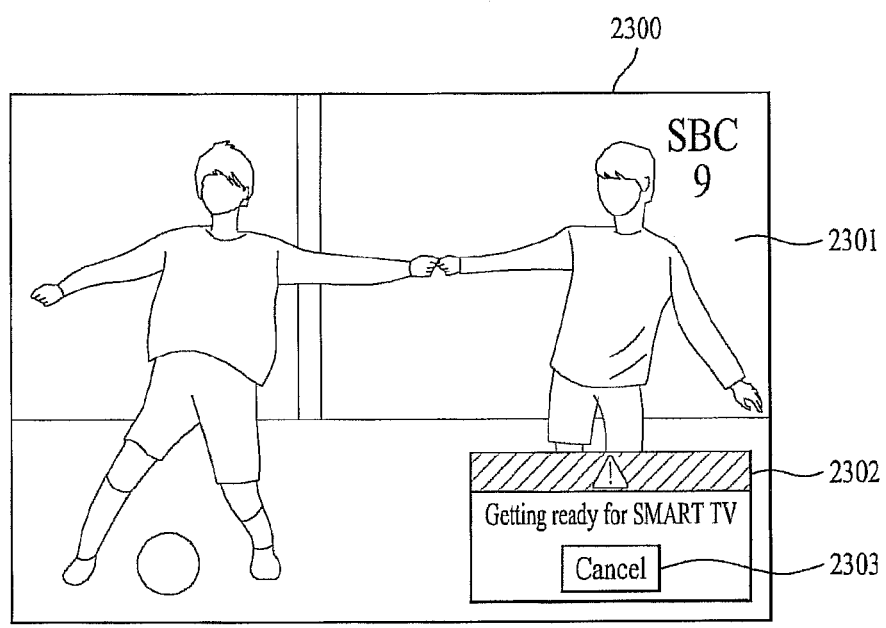
FIGS. 23 and 24 show additional embodiments of screens containing messages and/or indicators displayed during booting of a smart TV operating system.
Figure 24:
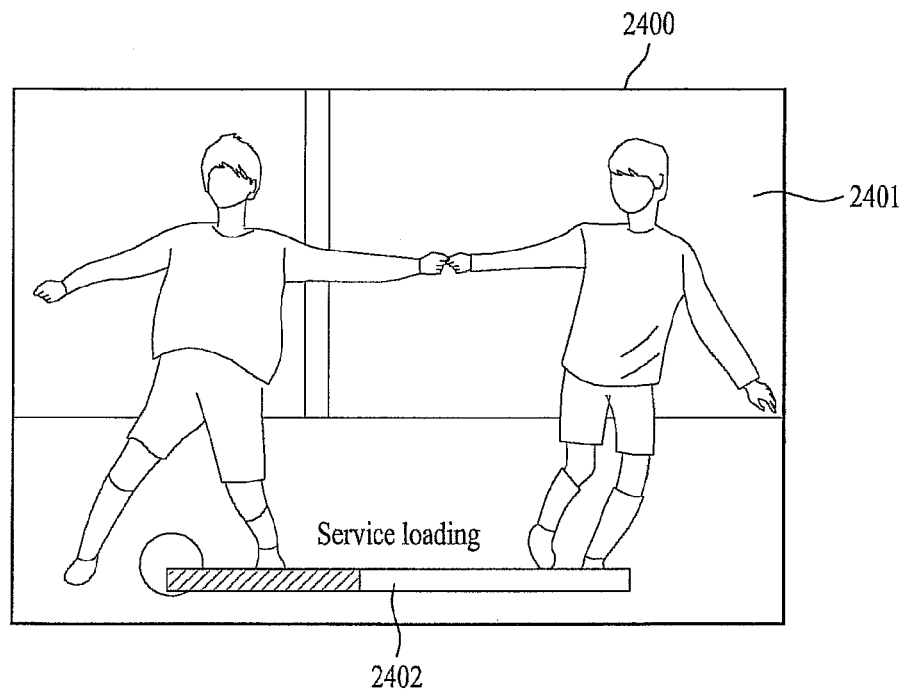

FIGS. 23 and 24 show additional embodiments of screens containing messages and/or indicators displayed during booting of a smart TV operating system. According to these embodiments, if a power source is applied to the display apparatus and it is ready for driving a module for displaying a terrestrial screen of the display apparatus, or if a signal for entering smart TV function is input while the user is watching terrestrial broadcasting through the display apparatus, the display screens as shown can be displayed.

In other words, the display apparatus executes booting of the operating system for using the functions of the smart TV on background and displays terrestrial broadcast screens 2301 and 2401 on the display module, whereby boredom of the standby time required for booting can be reduced.

Also, according to the embodiment of the present invention, the display screen may display a message 2302 indicating that the operating system is being booted as illustrated in FIG. 23, or may display the message together with a number or a graph 2402 indicating a predetermined time to reach booting completion as in FIG. 24.

Also, the message can be displayed in opaque color so as not to disturb the display screen of contents currently in service through the display apparatus.

Also, according to the embodiment of the present invention, the channel of the displayed terrestrial screen can be set previously. The channel of the displayed terrestrial screen will be described later in detail with reference to FIG. 28.

Figure 25:
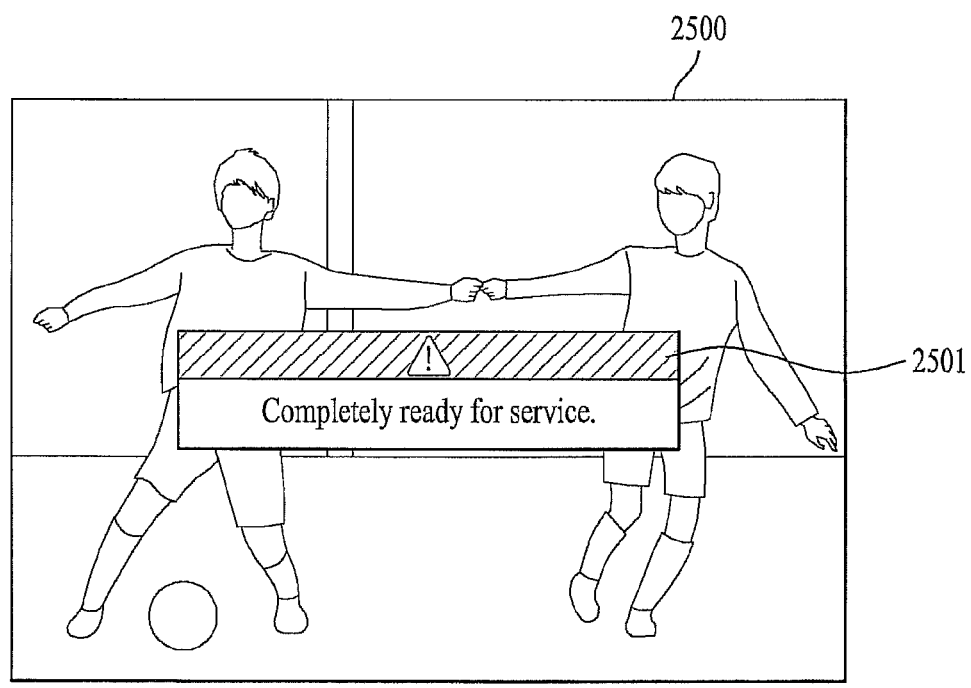
FIGS. 25 and 26 show additional embodiments of screens used in association with booting of a smart TV operating system.
Figure 26:
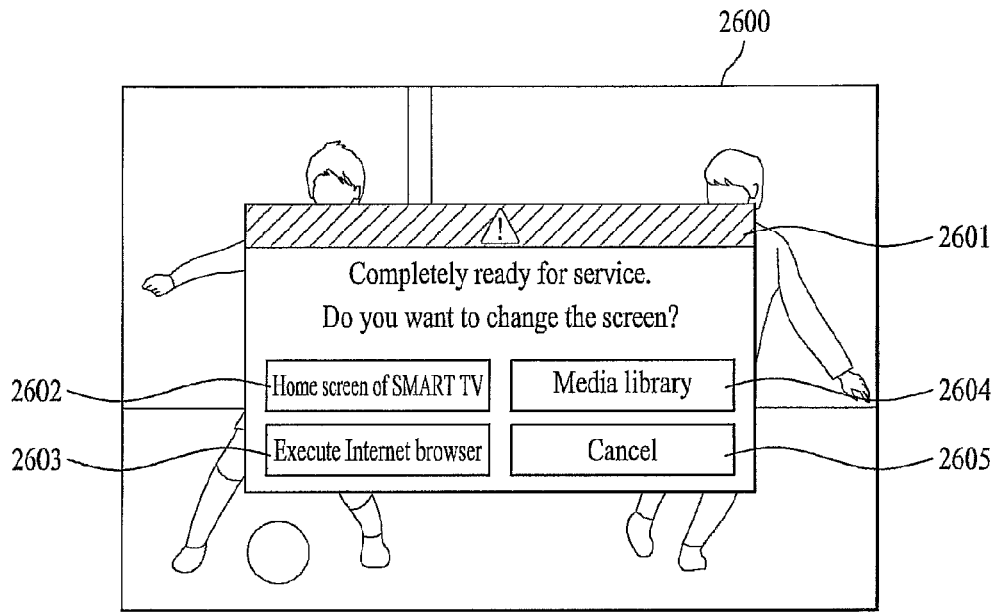

FIGS. 25 and 26 show additional embodiments of screens used in association with booting of a smart TV operating system. According to this embodiment, if the booting procedure of the smart TV is completed, predetermined completion messages 2501 and 2601 are output to the user so as to indicate that it is ready to use the functions of the smart TV. Through the completion messages, the user can perform input for using the functions of the smart TV.

According to one embodiment, the completion messages may be displayed to simply include completion functions only as illustrated in FIG. 25 (2501), or may be displayed to include menu items 2602, 2603, 2604 and 2605 for using various functions of the smart TV as illustrated in FIG. 26 (2601).

Referring to FIG. 26, examples of the menu items for using various functions of the smart TV include a menu item 2602 for moving to the home screen of the smart TV, a menu item 2604 for moving to a list screen of contents stored in the display apparatus, and a menu item 2603 for moving to a screen for using Internet service in the display apparatus.

Also, unlike shown, the menu items can be varied depending on user setup, and can be set to menu items for immediately executing most-used application or latest application.

Also, the menu items can include a menu item 2605 for canceling screen switching to allow the user to continue to use contents currently in service through the display apparatus.

Also, the completion messages and the menu items for using various functions of the smart TV can be displayed in opaque colors so as not to disturb the display screen of contents currently in service through the display apparatus.

Through the menu items, the user can promptly use desired services at the same time when the booting procedure of the smart TV is completed.

Figure 27:
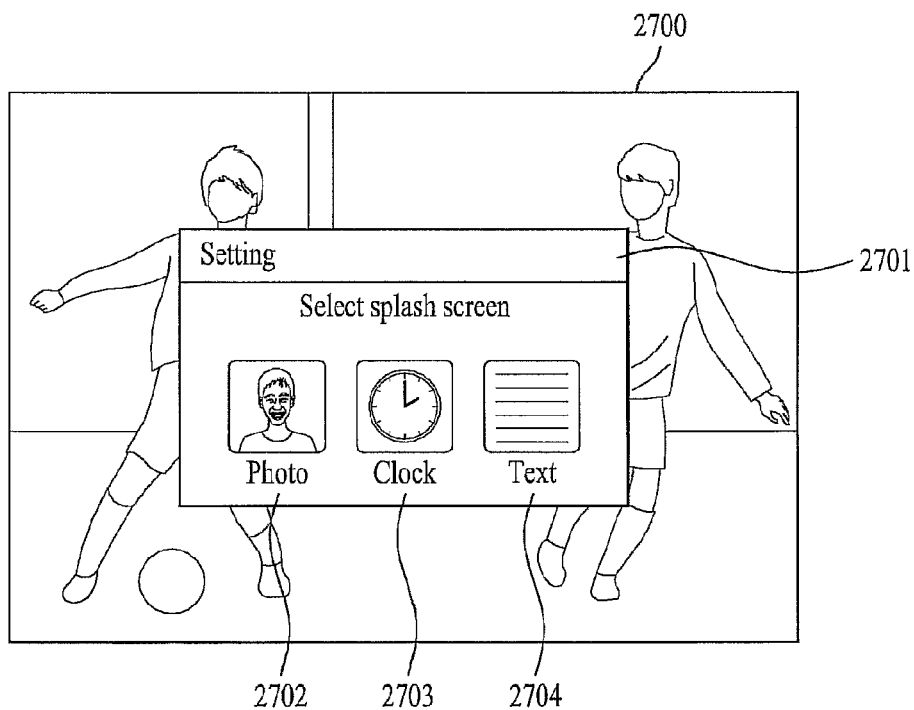
FIG. 27 shows one embodiment of a setup screen for use during booting a smart TV operating system.

FIG. 27 shows one embodiment of a screen 2700 that may include information for use during booting a smart TV operating system. According to this embodiment, the display apparatus can display a setup menu 2701 for setting a splash screen displayed during the booting procedure of the operating system for using the functions of the smart TV. For example, as illustrated in FIG. 27, the user can display a menu for receiving any one selection signal of photo 2702, clock 2703, and text 2704, as the splash screen.

The menu items included in the menu should be displayed in the display apparatus as the splash screen, and include functions only that can be implemented immediately from the booting controller at the same time when the power source is applied to the display apparatus.

According to one embodiment, if the user selects the photo 2702, a list of photos stored in the display apparatus is displayed, and the user can receive one or more selection signals of the photos for being displayed as the splash screen from the list of photos.

Also, if the selection signal of the clock 2703 is selected from the menu, a shape of the clock can be displayed, and if the selection signal of the text 2704 is selected from the menu, a list of text files stored in the display apparatus can be displayed.

If a predetermined item is selected from the menu 2701 by the user, the display apparatus can store setup information based on the selected item in the booting controller of the display apparatus and load the setup information during booting.

Through the aforementioned embodiment, each user who uses the display apparatus can improve convenience by setting a required splash screen.

Figure 28:
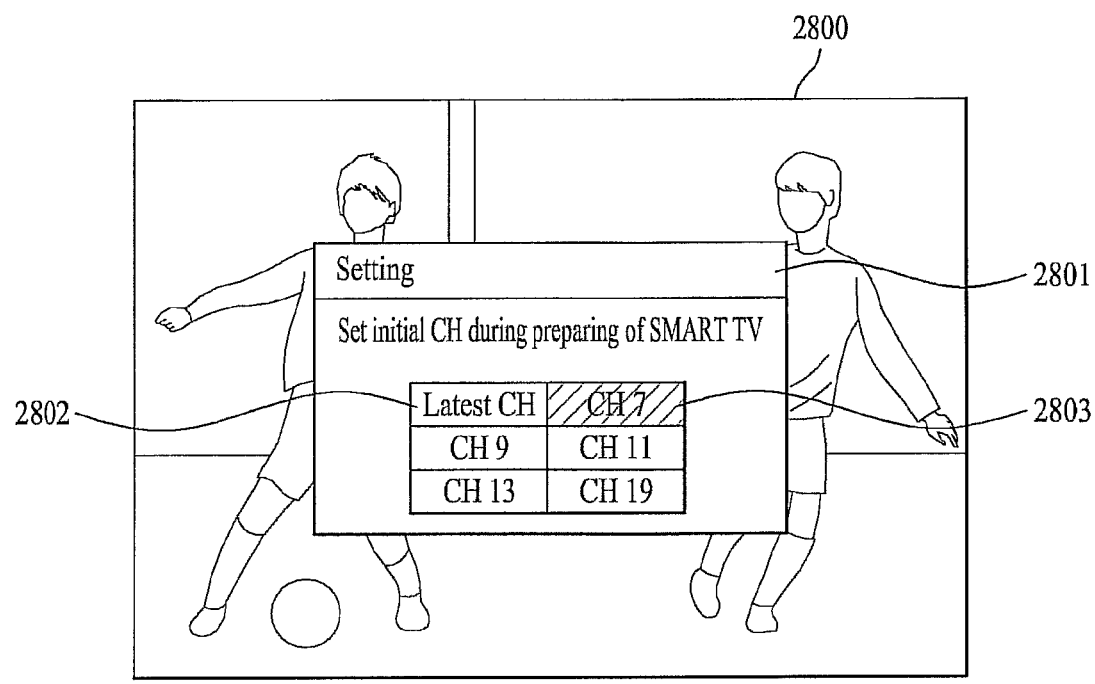
FIG. 28 shows another embodiment of a setup screen for use during booting of a smart TV operating system.

FIG. 28 shows another embodiment of a setup screen for use during booting of a smart TV operating system. According to this embodiment of the present invention, after the power source is applied to the display apparatus and the splash screen is displayed, if it is ready for driving a module for displaying terrestrial broadcasting, a channel of a terrestrial broadcast screen, which is displayed, can be set previously.

For example, the display apparatus can display a display screen that includes a menu 2801 for setting a terrestrial channel displayed for a booting time of the operating system for using the functions of the smart TV.

The menu can include a menu item 2803 for selecting predetermined channels recognized by the display apparatus, and can include a menu item for setting a random channel (not shown) or latest channel 2802 as the displayed terrestrial channel.

In other words, if a predetermined item is selected from the menu 2801 by the user, the display apparatus stores setup information based on the selected item in its booting controller, loads the setup information during booting, and displays terrestrial broadcasting transmitted from the selected terrestrial channel.

In this case, since the user can watch a desired channel at the booting standby time, convenience of the user can be improved.

Figure 29:
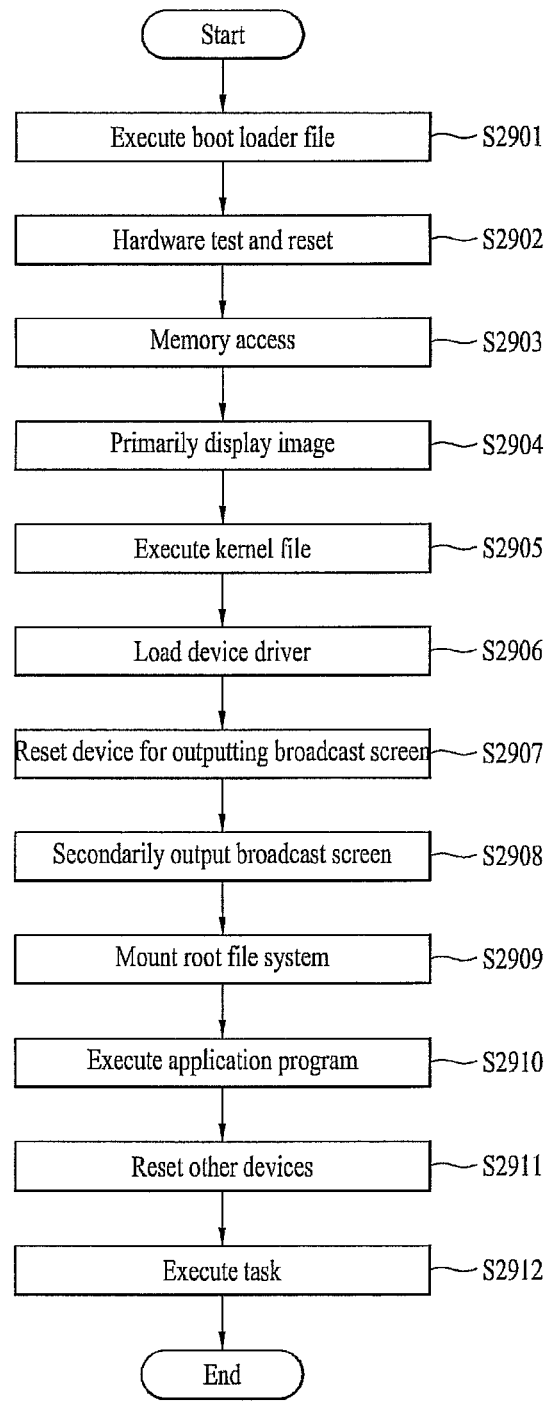
FIG. 29 shows steps included in one embodiment of generating a home screen during booting of a smart TV operating system.

FIG. 29 shows steps included in one embodiment of generating a home screen during booting of a smart TV operating system. If the power source of the display apparatus is turned on, the display apparatus executes a file from a boot loader (S2901), and performs a hardware test and a reset operation (S2902). After the reset operation is performed, the display apparatus accesses a memory (S2903) and primarily displays a specific image stored in the memory (S2904).

Also, the display apparatus executes a kernel image file loaded in the memory and starts a booting procedure of a kernel zone (S2905). The display apparatus loads drivers of respective devices provided therein in a memory zone by executing the kernel image file (S2906).

The display apparatus operates drivers of devices operated to output broadcasting program video and audio, such as a broadcast network interface, a broadcast signal processor, a display module and a speaker, so as to perform a reset operation of the corresponding devices (S2907).

After the reset operation is completed, the display apparatus performs a control operation to secondarily output a broadcast screen (S2908). Then, the display apparatus performs a root file system mount operation for performing application programs (S2909).

The display apparatus loads and executes various application programs stored in its memory medium and starts a booting procedure of an application program zone (S2910). The application programs correspond programs related to Internet access and application control, for example.

Then, a reset operation of devices other than the device for outputting a broadcast screen is performed (S2911). Finally, events desired by the user are started depending on the operation of the application programs (for example, Internet access and application control) (S2912).

Accordingly, it is advantageous in that the display apparatus can primarily display a specific image before a web or application programs are executed and secondarily display a broadcast screen.

Figure 30:
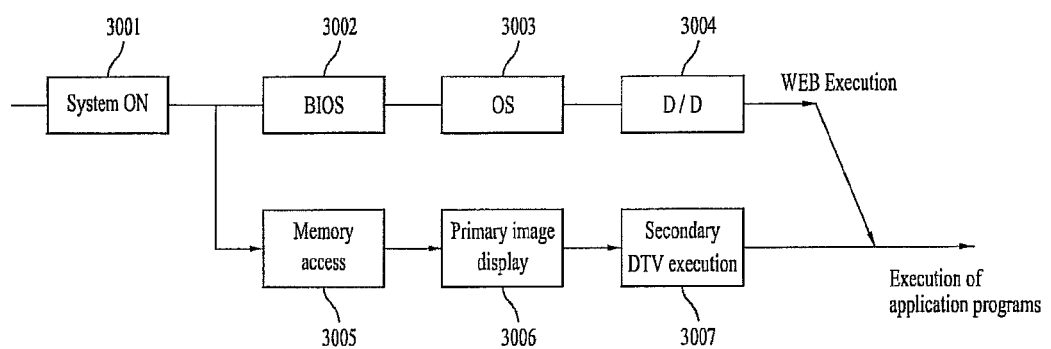
FIG. 30 shows one type of operation performed in association with display of a home screen during and/or booting of a smart TV operating system.

FIG. 30 shows one type of operation performed in association with display of a home screen during and/or booting of a smart TV operating system. If the power source of the display apparatus is turned on (3001), BIOS is performed (3002), loading of the operating system (OS) is performed (3003), and loading of device/driver is performed (3004).

The display apparatus accesses a memory in accordance with background operation regardless of BIOS and primarily displays a specific image stored in the memory (3006). Moreover, the display apparatus secondarily displays a DTV broadcast screen (3007).

If loading of device/driver (D/D) is completed, the display apparatus can execute both WEB and application programs. Accordingly, it is advantageous in that the display apparatus can primarily display a specific image before a web or application programs are executed and secondarily display a broadcast screen.

One or more of the aforementioned embodiments may be implemented in a recording medium, which can be read by a processor provided in the display apparatus, as a code that can be read by the processor. The recording medium that can be read by the processor includes all kinds of recording media in which data that can be read by the processor are stored.

Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor can be stored and implemented in a distributive mode.

One or more embodiments described here, therefore, are directed to a display apparatus and a method for controlling the display apparatus, which can improve convenience in use of a user.

One or more of these embodiments provide a display apparatus and a method for controlling the display apparatus, which can provide various user interfaces.

One or more of these embodiments provide a display apparatus and a method for controlling the display apparatus, in which a user can make feel a booting time, which requires a long time in a smart TV, short.

In accordance with one embodiment, a multifunctional display device comprises a display; a storage device to store data; a tuner to receive a broadcast signal; a network interface to receive packet data; an input interface to receive signals from a wireless remote controller, a processor to control display of information during booting of an operating system. The operating system is booted in response to a predetermined signal, and the information includes first information corresponding to visual information, and second information indicating that the operating system is currently booting, wherein the operating system controls display of multimedia content.

The multimedia content includes information received through the network interface and one or more applications to be executed. The media information may include at least one image stored in the storage device, and the visual information may include a plurality of images stored in the storage device, the images sequentially displayed during booting of the operating system.

In addition, the visual information may include video from a predetermined channel received through the tuner, and the second information may include a status bar indicating a status of booting the operating system.

In addition, the processor controls the display of third information after operating system booting has been completed, the third information includes a menu having one or more options for replacing the first information with fourth information. The fourth information may correspond to execution of an internet browser, or may correspond to a media library, the media library including one or more files stored in the storage device or a memory coupled to the display device. In addition, the visual information corresponds to execution of a predetermined application.

The processor controls display of third information which allows for selection of a change of the first information. Also, the first information may be received through the tuner and the third information is generated by an OSD processor. Also, the first and third information may be simultaneously displayed. The third information may allow for selection of one of a plurality of predetermined television channels to be displayed during booting of the operating system.

In accordance with one embodiment, an information management method comprises displaying information on a screen of a display device during booting of an operating system, wherein: the operating system is booted in response to a predetermined signal, the first information corresponds to visual information, and the second information indicates that the operating system is currently booting, wherein the operating system controls display of multimedia content and wherein the display device includes a storage device to store data, a tuner to receive a broadcast signal, a network interface to receive packet data, and an input interface to receive signals from a wireless remote controller.

The multimedia content may include information received through the network interface and one or more applications to be executed. In addition, the method may include displaying third information after operating system booting has been completed, wherein the third information includes a menu having one or more options for replacing the first information with fourth information.

The fourth information may correspond to execution of an internet browser, or may correspond to a media library, the media library including one or more files stored in the storage device or a memory coupled to the display device. Also, the first information may be received through the tuner and the third information is generated by an OSD processor.

The suffixes 'module' and 'unit' may be given or used in common by considering facilitation in writing this disclosure only but fail to have meanings or roles discriminated from each other.

Also, the operating system for the smart TV or multimedia application as described herein may be different from a general operating system of the television or monitor. In another embodiment, the operating system may be included as part of (e.g., included in the software of) the operating system used to control the generate television or monitor functions.

Also, a display device as described herein may include an intelligent display device additionally provided with, for example, a computer support function in addition to a broadcasting receiving function.

The display device can be provided with a more convenient interface such as a manual input unit, a touch screen and a spatial remote controller, in accordance with additional Internet function in addition to a basic broadcasting receiving function.

Also, the display device enables e-mailing, web browsing, banking or games by accessing Internet or computer in accordance with the support of wire or wireless Internet function. For these various functions, a standardized general-purpose operating system (OS) can be used.

Accordingly, since the display device disclosed herein can freely be provided with or delete various applications on a general-purpose OS kernel, it may perform user-friendly various functions. More detailed examples of the display device include network TV, HBBTV, smart TV. The display device may be applied to a smart phone as the case may be.

Also, the terms "content" or "contents" may correspond to, for example, digital information provided through various wire and wireless communication networks and can be used through a display device, and its contents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of processing interactively in a smart television accessible to an internet network, the method comprising:

receiving, from a remote controller, a power-on signal for applying a power source to the smart television;

displaying a specific image on a display, wherein the specific image is stored in a storage device of the smart television;

after displaying the specific image and removing the specific image from the display, displaying both a specific broadcast program and booting status information indicating a status of booting of a system to connect to a second network, wherein the specific broadcast program is received from a first network; and displaying at least one option for an internet connection after the booting of the system to connect to the second network is completed, wherein the at least one option is used to receive at least one content from a second network.

2. The method of claim 1, wherein the specific image is replaced to a content stored in the storage device, and a data type of the content is different from the data type of the specific image.

3. The method of claim 1, wherein the first network corresponds to a broadcast network, and the second network corresponds to an internet network.

4. A smart television accessible to an internet network, the smart television comprising:

an interface module configured to receive, from a remote controller, a power-on signal for applying a power source to the smart television;

a memory configured to store a specific image;

a display module configured to be coupled to a processor; and the processor configured to control the display module to display the specific image, wherein the processor further controls the display module to:

display both a specific broadcast program and status information prior to completion of booting of a system to connect to a second network, wherein the specific broadcast program is received from a first network, and the status information indicates a status of the booting, and display at least one menu option after completing the booting, wherein the at least one menu option is used to receive at least one content from the second network.

5. The smart television of claim 4, wherein the specific image is replaced to a content stored in the memory, and a data type of the content is different from the data type of the specific image.

6. The smart television of claim 4, wherein the first network is same as the second network or the first network is different from the second network.

7. The smart television of claim 4, wherein the processor to receive a selection of one of the displayed at least one menu option.

8. The smart television of claim 4, wherein the status information indicates the television is connected to the second network.

9. The smart television of claim 4, wherein the display of the at least one menu option includes displaying a plurality of menu items for using various features via the second network.

10. The smart television of claim 4, wherein the processor to control the display module to display a splash screen that displays a plurality of options, and the processor to receive a selection of one of the displayed plurality of options of the splash screen.

11. A smart television of processing data during booting related to connect to an internet network, the smart television comprising:

a display;

a storage device configured to store data;

a network interface configured to connect the internet network;

an input interface configured to receive signal from a wireless remote controller;

a processor configured to control display of first and second information during booting of a smart TV operating system and third information after the booting of the smart TV operating system has been completed, wherein the smart TV operating system controls display of multimedia content and is booted in response to a predetermined signal corresponding to turn-on of a power source, wherein the booting of the smart TV operating system includes loading and executing an application program related to internet access, and wherein the first information corresponds to visual information, the visual information including a splash screen image stored in the storage device and video from a broadcast channel, the splash screen image being displayed before the video, the second information includes a message indicating that the operating system is currently booting, and the third information includes a menu having one or more options related to internet access.

12. The smart television of claim 11, wherein the display displays the video in a first region while displaying the third information in a second region after the booting of the smart TV operating system has been completed.

13. The smart television of claim 11, wherein the one or more options included in the menu are for replacing the first information with fourth information.

14. The smart television of claim 13, wherein the fourth information corresponds to execution of an internet browser.

15. The smart television of claim 11, wherein the splash screen image corresponds to a logo pre-stored in the storage device, further the splash screen image is changeable depending on a user's selection.

16. A method of processing data during booting related to connect to an internet network in a smart television, the method comprising:

receiving signal from a wireless remote controller;

controlling display of first and second information during booting of a smart TV operating system and third information after the booting of the smart TV operating system has been completed, wherein the smart TV operating system controls display of multimedia content and is booted in response to a predetermined signal corresponding to turn-on of a power source, wherein the booting of the smart TV operating system includes loading and executing an application program related to internet access, and wherein the first information corresponds to visual information, the visual information including a splash screen image stored in a memory and video from a broadcast channel, the splash screen image being displayed before the video, the second information includes a message indicating that the operating system is currently booting, and the third information includes a menu having one or more options related to internet access.

17. The method of claim 16, further comprising:

displaying the video in a first region while displaying the third information in a second region after the booting of the smart TV operating system has been completed.

18. The method of claim 16, wherein the one or more options included in the menu are for replacing the first information with fourth information.

19. The method of claim 18, wherein the fourth information corresponds to execution of an internet browser.

20. The method of claim 16, wherein the splash screen image corresponds to a logo pre-stored in the storage device, further the splash screen image is changeable depending on a user's selection.

* * * * *